US012560182B1

(12) United States Patent
Osborne

(10) Patent No.: US 12,560,182 B1
(45) Date of Patent: Feb. 24, 2026

(54) HYDRAULIC ISOLATION CYLINDER-BASED SYSTEM

(71) Applicant: SRI ENERGY, INC., Sugar Land, TX (US)

(72) Inventor: Sean A. Osborne, Meadows Place, TX (US)

(73) Assignee: SRI ENERGY, INC., Sugar Land, TX (US)

( * ) Notice: Subject to any disclaimer, the term of this patent is extended or adjusted under 35 U.S.C. 154(b) by 0 days.

(21) Appl. No.: 19/044,871

(22) Filed: Feb. 4, 2025

(51) Int. Cl.
*F15B 3/00* (2006.01)
*F15B 20/00* (2006.01)

(52) U.S. Cl.
CPC .............. *F15B 3/00* (2013.01); *F15B 20/005* (2013.01); *F15B 2211/30525* (2013.01)

(58) Field of Classification Search
CPC .......................................................... F15B 3/00
See application file for complete search history.

(56) References Cited

U.S. PATENT DOCUMENTS 5,101,907 A * 4/1992 Schultz ............... E21B 23/0412 166/336
6,250,199 B1 * 6/2001 Schulte ..................... F15B 3/00 60/398
6,269,641 B1 8/2001 Dean
9,778,069 B2 10/2017 Jonsjord
2005/0115712 A1 6/2005 Watson
2005/0178560 A1 8/2005 Johansen et al.
2010/0326652 A1 12/2010 Borgstadt
2019/0383421 A1 12/2019 McKim et al.
2020/0011384 A1 * 1/2020 Arikawa ................... F15B 3/00
2022/0205462 A1 * 6/2022 Olvera Díaz ........... F15B 15/18
2023/0143865 A1 * 5/2023 Flatt .......................... F04B 9/08 60/412

FOREIGN PATENT DOCUMENTS

KR 20240139170 A * 9/2024 ................ F15B 3/00
RU 2683349 C1 * 3/2019 ................ F15B 3/00

OTHER PUBLICATIONS

KR 20240139170 A machine translation (Year: 2024).*
RU 2683349 C1 machine translation (Year: 2019).*

(Continued)

*Primary Examiner* — Matthew Wiblin
(74) *Attorney, Agent, or Firm* — Trop, Pruner & Hu, P.C.

(57) ABSTRACT

An embodiment includes a device that limits the fluid volume that can travel through a hydraulic system or loop before stopping the flow of hydraulic fluid. This can be used to limit the number of rotations/overall movement of a hydraulic motor. It can also be used to create an intermediate position of a hydraulic cylinder between fully extended or retracted. An embodiment enables the direct replacement of a direct acting, piston type actuator with that of a rotary vane motor without reworking the control devices or procedure/training of users/operators. An embodiment can be used to approximate the binary position of a remote actuator without directly monitoring that actuator.

19 Claims, 22 Drawing Sheets

(56) References Cited

OTHER PUBLICATIONS

Probert, Hydraulics Systems and Vane Motor Leakage, LinkedIn, Mar. 24, 2023, published Mar. 24, 2023, downloaded from https://www.linkedin.com/pulse/hydraulics-systems-vane-motor-leakage-kyle-probert/ (2 pages).

"Into to Directional Control Valves", downloaded Nov. 8, 2024 from https://www.lunchboxsessions.com/materials/directional-control-valves/intro-to-directional-control-valves-lesson (13 pages).

"Actuator", Wikipedia, downloaded Nov. 8, 2024 from https://en.wikipedia.org/wiki/Actuator (3 pages).

International Searching Authority, International Search Report and Written Opinion dated Oct. 27, 2025 in International Patent Application No. PCT/US2025/014417 (13 pages).

* cited by examiner

*Single cylinder version*

Fig. 2A
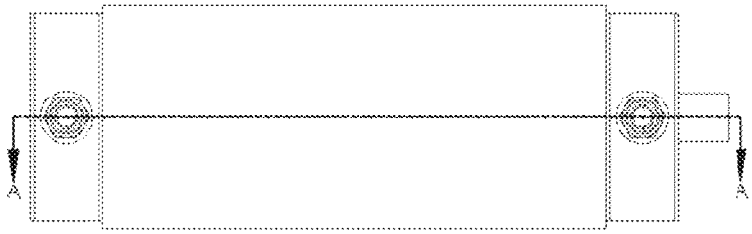
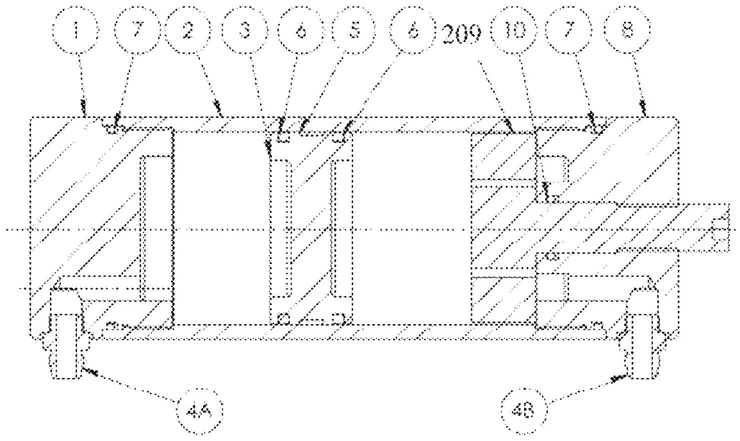
Fig. 2B
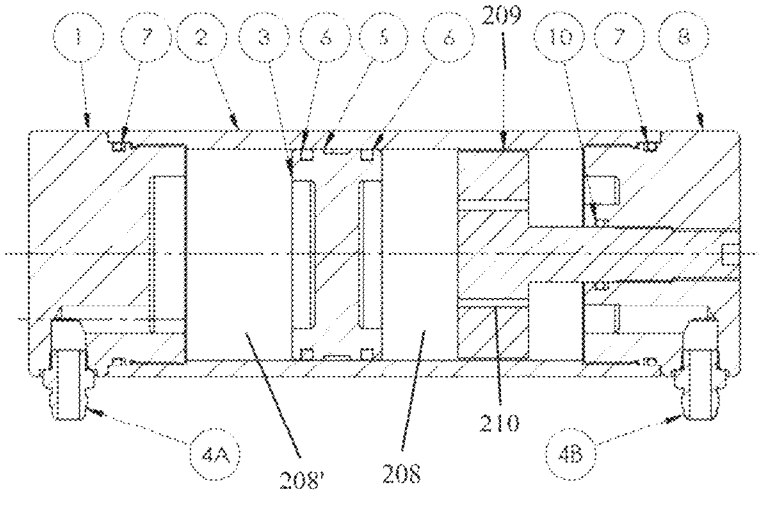
Fig. 2C

*Stacked cylinder version*

Row 1
Row 2
Row 3
Row 4
Row 5

ROW 4

ROW 5

ROW 6

ROW 7

ROW 2

ROW 3

ROW 4

HYDRAULIC ISOLATION CYLINDER-BASED SYSTEM

TECHNICAL FIELD

Embodiments of the invention are in the field of oilfield equipment.

BACKGROUND

A hydraulic actuator typically uses the pressure of a liquid (usually oil) to cause a piston to slide inside a hollow cylindrical tube to produce linear, rotatory or oscillatory motion. In a single acting actuator the fluid pressure is applied to just one side of the piston, so that it applies useful force in only one direction. The opposite motion may be affected by a spring, by gravity, or by other forces present in the system. In a double acting actuator, the return stroke is driven by fluid pressure applied to the opposite side of the piston. A hydraulic actuator can be used to, for example, operate valves in pipelines and other industrial fluid transport installations.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

FIG. 2A includes a side view of an HIC. FIGS. 2B and 2C show cross-sectional views of an HIC with variable volume positions.

FIGS. 13A-1, 13A-2, 13A-3 do not include an HIC and FIGS. 13B-1, 13B-2, 13B-3 do include an HIC.

FIG. 14A addresses a 2 position DCV without an HIC and FIG. 14B addresses the same DCV with an HIC.

FIG. 14C addresses a 3 position DCV without an HIC and FIG. 14D addresses the same DCV with an HIC.

DETAILED DESCRIPTION

Figure 1A:
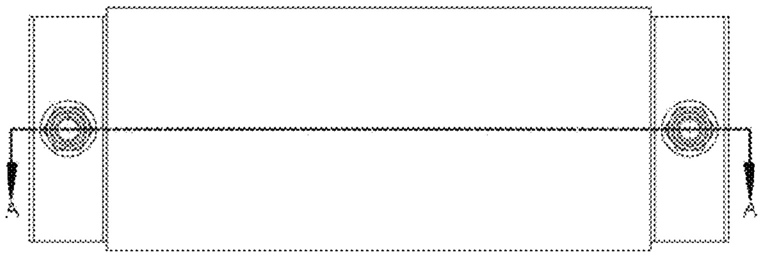
FIG. 1A includes a side view of a hydraulic isolation cylinder (HIC).

Reference will now be made to the drawings wherein like structures may be provided with like suffix reference designations. In order to show the structures of various embodiments more clearly, the drawings included herein are diagrammatic representations of structures. Thus, the actual appearance of the fabricated structures, for example in a photo, may appear different while still incorporating the claimed structures of the illustrated embodiments (e.g., walls may not be exactly orthogonal to one another in actual fabricated devices). Moreover, the drawings may only show the structures useful to understand the illustrated embodiments. Additional structures known in the art may not have been included to maintain the clarity of the drawings. For example, not every layer of a device is necessarily shown. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. A "First" instance of a feature does necessarily mean there is a "Second" instance of the feature. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Phrases such as "comprising at least one of A or B" include situations with A, B, or A and B.

Embodiments provide numerous advantages. First, an embodiment includes a device that limits the fluid volume that can travel through a hydraulic system or loop before stopping the flow of hydraulic fluid. This can be used to limit the number of rotations/overall movement of a hydraulic motor. It can also be used to create an intermediate position of a hydraulic cylinder between fully extended or retracted. Second, an embodiment enables the direct replacement of a direct acting, piston type actuator with that of a rotary vane motor without reworking the control devices or procedure/training of users/operators. Third, an embodiment can be used to approximate the binary position of a remote actuator without directly monitoring that actuator. Fourth, an embodiment can be used to convert a fail-in-place actuator to a fail-safe actuator.

Embodiments address a variety of problems.

Problem 1: Rotary hydraulic motors such as vane motors, gerotor, and gerotor motors allow a limited amount of hydraulic fluid to internally bypass or slip past the internal drive mechanism without producing work or movement of the output shaft. This is due to the necessary internal clearance between the motor components. This internal leakage can cause significant issues including but not limited to, depressurization of the hydraulic supply, overloading of the pressure supply system, depletion of the hydraulic fluid reservoir, or false triggering of the leak detection system. When used with certain existing sensor systems, this internal leakage can also indicate a failure to reach a desired position (open or closed). When a pressure switch is used to indicate reaching a desired position, the minimum pressure to trigger that switch/indicator may not be reached due to the leakage through the motor. When a flow meter is used to indicate reaching a desired position, the internal leakage of the motor may indicate that the actuator/load is still moving. When used with a differential pressure gauge/sensor/switch, the flow through the motor may show additional pressure on the return line due to the leakage and insufficient pressure on the supply line thus indicating movement though the motor.

Solution: An embodiment of a HIC has a fixed volume and the internal dividing piston acts as a mechanical limit on the volume of flow through the system.

Problem 2: Hydraulic actuators can approximate position detection by monitoring the hydraulic pressure in the system. When a standard hydraulic cylinder reaches its full limit (i.e., moves as far in one direction as it can go), the pressure in the system stabilizes and flow stops. When used with a pressure indicator or flow indicator, control systems can use these inputs to determine if the hydraulic cylinder is at its travel extent. This method is less accurate when there is internal leakage through the rotary hydraulic motor (instead of a typical hydraulic cylinder) and can falsely indicate a loss of hydraulic fluid or falsely indicate a failure for the piston to reach its full limit (i.e., moves as far in one direction as it can go).

Solution: Reference position/orientation of the valve/actuator that is acted on by the system described herein can be identified via the position of the dividing piston(s) in the intermediary cylinder(s) without the need for observation or external sensor connections since the HIC functions in the same manner as a standard hydraulic cylinder. The position can be approximated using existing pressure sensors on the open and close lines to the HIC which will indicate the system position once the HIC reaches the limit of travel. Other means can be used to determine incremental positions such as electrical position sensors installed in/on the HIC or via a visible indicator shaft on the HIC. For example, the HIC can be deployed near the operator (so the operator can see the HIC and the location of the piston) even if the actuator is far removed from the operator.

Problem 3: Rotary hydraulic motors have specific operating requirements for fluid pressure, temperature, viscosity, and chemistry. These requirements often dictate which applications are able to use a rotary hydraulic motor vs a hydraulic cylinder. It is not always possible to change existing fluid used in hydraulic systems to match the new requirements of a hydraulic motor.

Solution: An embodiment creates a fully isolated fluid volume that is capable of fully isolating the hydraulic fluid that flows through the rotary hydraulic motor from the hydraulic fluid used in the hydraulic power unit and control circuit.

This controlled volume prevents contamination of existing systems and eliminates the need for a secondary discrete hydraulic system or loop.

The controlled volume also enables the system to function with High Pressure Air (HPA) or other gasses by acting on the control side of the internal dividing piston.

When used with pistons of a staggered size, this system can be used to increase or decrease the delivered pressure to the motor.

Problem 4: When a project requirement changes, the conversion of a driven member from fail in place to fail safe can require removal and replacement of the driven member with a new component. This is a significant cost when used in a subsea application where retrofitting of components is not possible without returning the valve or components to the surface.

Solution: An embodiment of the HIC also allows the conversion of the driven actuator, from a fail-in-place, to a fail-open, or fail-closed actuator without changing any of the mechanical components of the actuator itself. Since the HIC can be mounted anywhere, the components can be readily accessible on deck or in a non-hazardous area to facilitate service or changes to the system.

Problem 5: When a hydraulic system is able to operate at a higher pressure than required by ancillary devices, it is simple to reduce the delivered pressure to a level that is acceptable.

Increasing the pressure however requires external inputs to achieve or consumes additional hydraulic fluid.

Solution: The HIC can be configured with staggered piston sizes to create the proper output pressure to the system regardless of the input pressure. For example, the input pressure to the system is 1,000 PSI but the actuator requires 1,500 PSI. This may be achieved by setting the ratio of input piston area to output piston area to match the inverse of the input pressure available to output pressure required ratio.

Figure 1B:
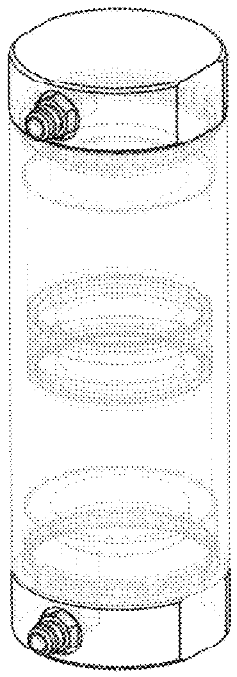
FIG. 1B provides a phantom perspective view of the HIC.
Figure 1C:
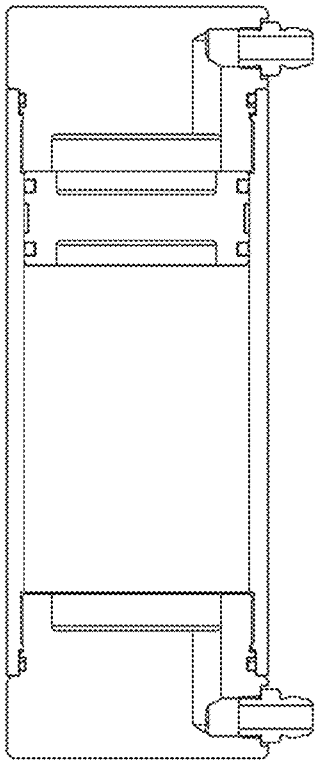
FIGS. 1C, 1D, 1E show cross-sectional views of an HIC with its piston in varying positions.
Figure 1D:
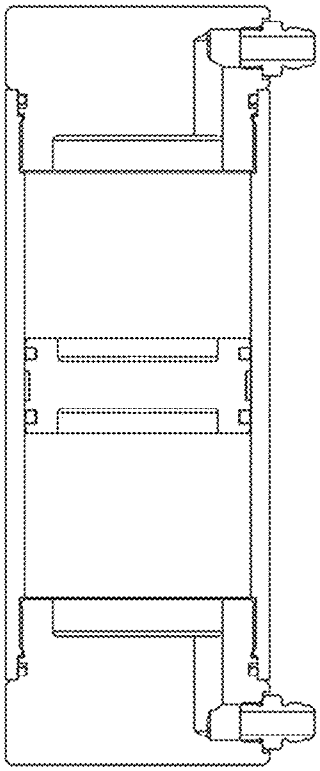
Figure 1E:
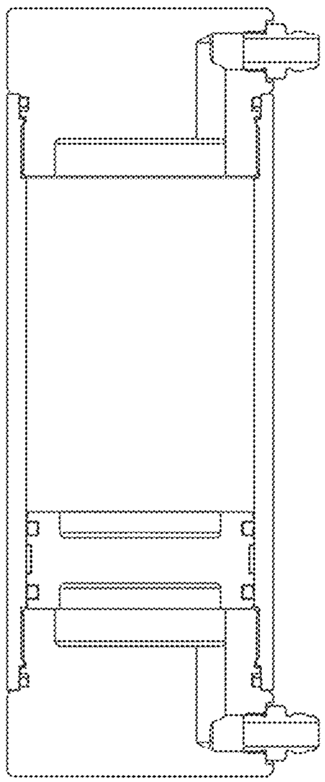
Figure 1F:
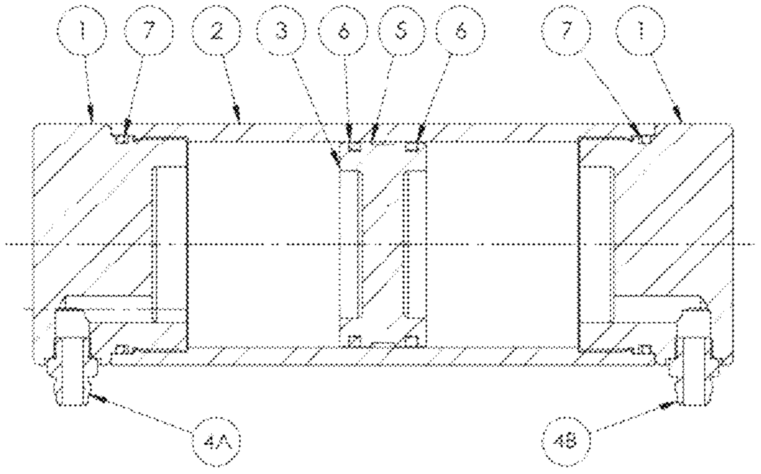
FIG. 1F shows a cross-sectional view of the HIC with its piston located in a middle location within the HIC.
Figure 3A:
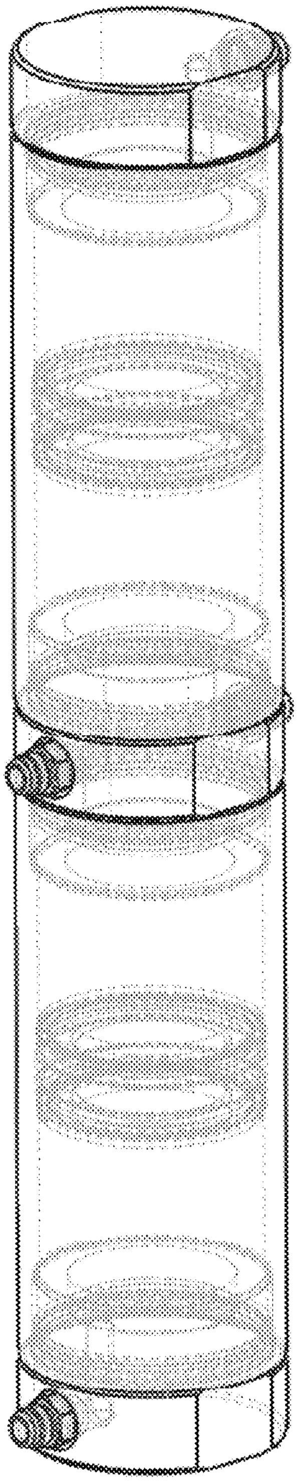
FIG. 3A provides a perspective phantom view of two stacked cylinders.
Figure 3B:
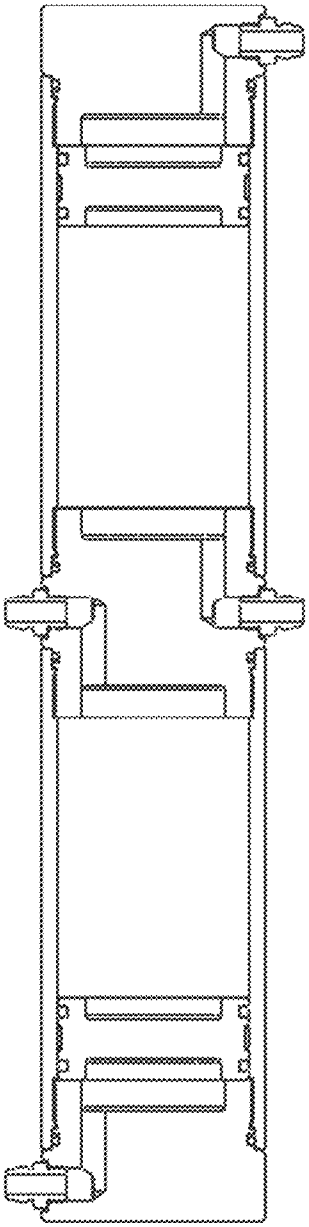
FIGS. 3B-3D provide cross-sectional views of stack cylinders with pistons in varying positions.
Figure 3C:
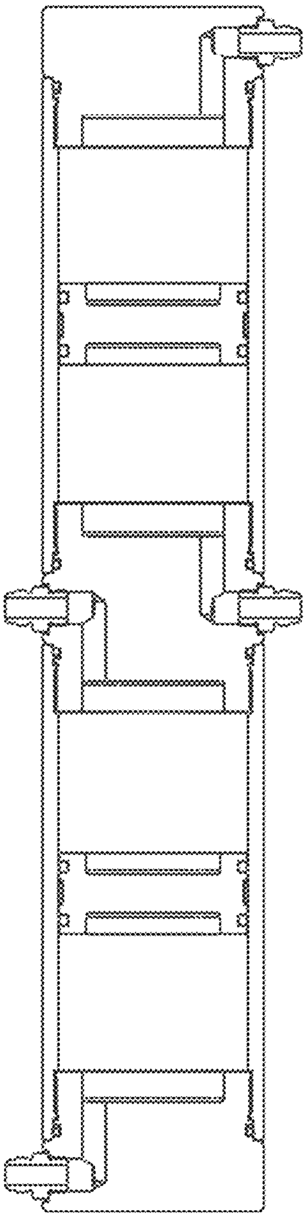
Figure 3D:
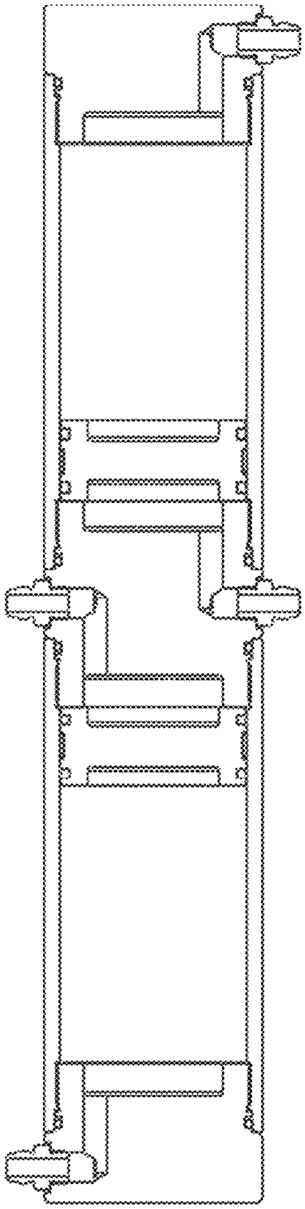
Figure 4:
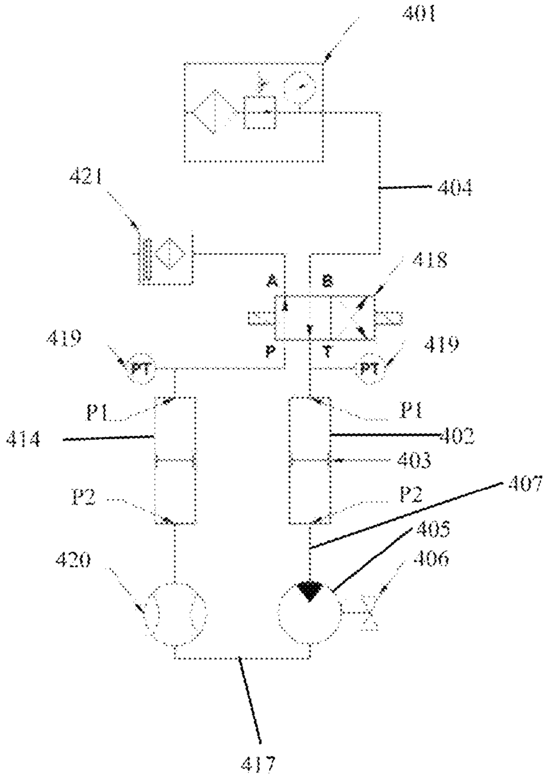
FIG. 4 is a piping and instrumentation diagram of a HIC based system.
Figure 5:
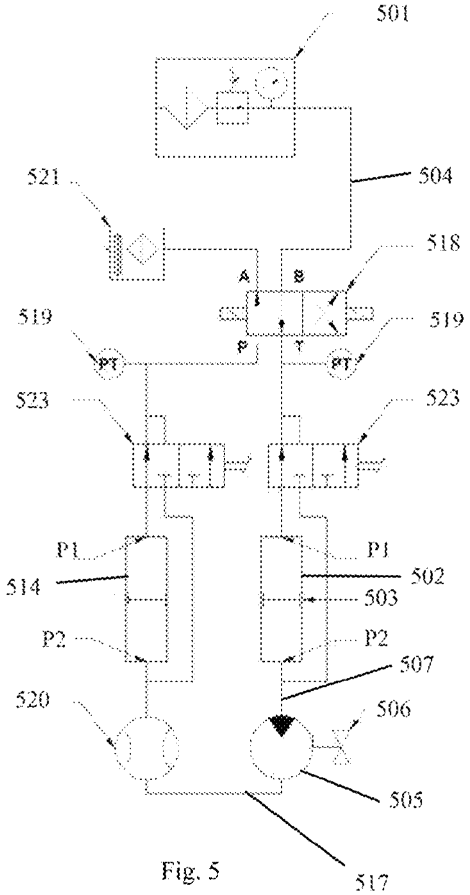
FIG. 5 is a piping and instrumentation diagram of a HIC based system with bypass lines.
Figure 6:
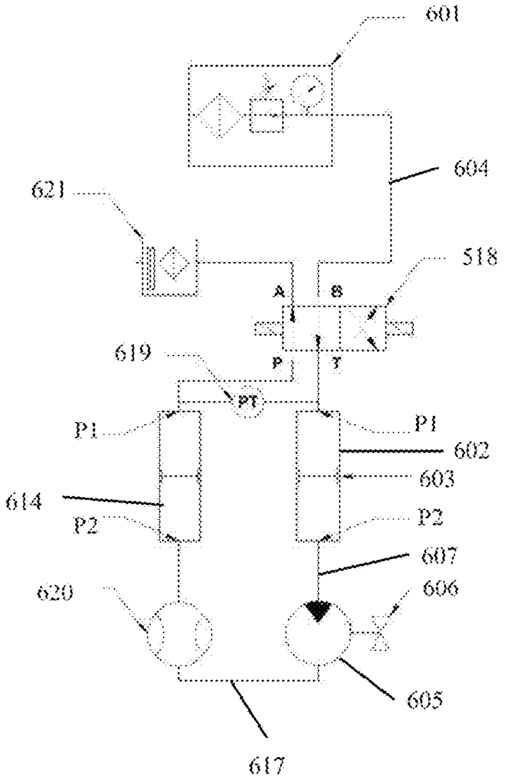
FIGS. 6 and 7 are similar to FIGS. 5 and 6 but show differential pressure sensing systems.

FIG. 1A includes a side view of a HIC. FIG. 1B provides a phantom perspective view of the HIC. FIGS. 1C, 1D, 1E show cross-sectional views of an HIC with its piston in varying positions. FIG. 1F shows a cross-sectional view of the HIC with its piston located in a middle location within the HIC.

Cylinder end cap 1 is coupled to cylinder body 2. Internal dividing piston 3 slides within the body 2. Direction 1 fitting 4A and direction 2 fitting 4B interface hydraulic fluid lines. Piston wear band 5 is located between piston seals 6. Cylinder end cap seal 7 interfaces cylinder end cap 1.

FIG. 2A includes a side view of an HIC. FIGS. 2A and 2B show cross-sectional views of an HIC with variable volume positions. Cylinder end cap 1 is coupled to cylinder body 2. Internal dividing piston 3 slides within the body 2. Direction 1 fitting 4A and direction 2 fitting 4B interface hydraulic fluid lines. Piston wear band 5 is located between piston seals 6. Cylinder end cap seal 7 interfaces adjustable cylinder end cap 8. Adjustable travel limiter 209 interfaces adjustable travel limiter seal 10.

FIGS. 1A-1F address a fixed volume HIC while FIGS. 2A-2C address a HIC that can be user-adjusted to have various fluid volume limits. Adjustment is done via external means, such as an internal hex cut is used to provide means for adjustment. In another embodiment, this could be an external hex or other means. The adjuster could further be made as a separate entity from the internal piston stop to allow multiple adjustment length ranges.

Embodiments in FIGS. 1A and 2A are for a single cylinder. However, the embodiment of FIGS. 3A, 3B, 3C, 3D consists of two cylinders stacked along the main axis and connected mechanically but not fluidically via a combined center cap.

A general description of FIGS. 4-11 is now addressed.

Power to the hydraulic circuit is provided via a Hydraulic Power Unit (HPU) (e.g., 401). This could be an electrically driven hydraulic pump, an air over hydraulic pump, a piston or bladder type hydraulic accumulator, other device, or combinations thereof.

Pressure and flow are created within the HPU and delivered via a communicating member such as a hose or pipe to the Directional Control Valve (DCV) (e.g., 418).

The DCV acts to control the flow path that the fluid takes through the circuit. The DCV may be a 2-position directional control valve where the flow path of the hydraulic fluid switches direction based on the valve position. In another embodiment this valve can be a 3 position DCV where a third position is capable of fully isolating the downstream hydraulic circuit from system flow/pressure. In any embodiment the DCV can be powered, manually operated, or powered with a manual override.

When the DCV is actuated, fluid flows from the DCV into port P1 on the HIC. The internal dividing piston within the HIC is displaced until it rests against the internal stop. Since the hydraulic fluid in the system is a non-compressible fluid, any fluid volume entering one side of the cylinder must also exit the other side of the cylinder. Volume in must equal volume out. Once the internal dividing piston reaches its limit, fluid flow through the system stops and pressure upstream of the internal dividing piston stabilizes at the system set pressure.

The fluid that exits from port P2, then enters the motor where it drives the rotor and motor shaft before exiting the other motor port.

In one embodiment, the fluid from the motor then enters a second HIC via port P2 and displaces the internal floating piston until it rests against the internal stop. At this point, the motor comes to a rest.

The fluid exiting the second HIC from port P1, flows through the other circuit of the DCV and returns to the hydraulic fluid reservoir (e.g., 421).

When the DCV is reversed, the hydraulic fluid enters port P1 and acts on the internal dividing piston in the HIC forcing fluid out of the P2 port and into the motor where it drives the rotor and motor shaft before exiting the other motor port and flowing into port P2.

The fluid exiting the HIC from port P1, flows through the other circuit of the DCV and returns to the hydraulic fluid reservoir (e.g., 421).

When configured in a pressure conversion arrangement, the piston on one side of the HIC is connected to a second piston in the companion cylinder of the HIC of a different diameter with a mechanical linkage. See, e.g., FIGS. 8-9. The difference in hydraulic piston area allows the pressure on one side of the piston to increase the pressure on the other piston. In another embodiment, the piston sizing can decrease the pressure on the other side of the piston.

When configured as fail in place, no spring is necessary on the actuator/driven member itself. If the operator decides that fail-safe-closed or fail-safe-open is required after installation, the HIC can be reconfigured to include a spring on one side of the piston. See, e.g., FIGS. 10-11. The spring could be a mechanical spring of a coil type. The spring could also be a conical washer or other metallic spring. An elastomeric spring could be substituted. A compressible gas could also be used to create an equivalent force that behaves as a spring.

When a direct acting or hydraulic cylinder type actuator is replaced with a rotary motor, control changes may be required. These changes can take the form of operational/institutional changes (I.E. retraining personnel) or mechanical/infrastructure changes (I.E. changing physical components or control programming). Operators oftentimes do not want to do either of these due to risk or expense.

A typical linear hydraulic cylinder can be operated with a 3-position spring return DCV, a 3 position non-centering DCV, or a 2 position DCV. A 3-position spring return DCV allows flow in positions 1 and 3 which acts to extend or retract a hydraulic cylinder. In position 2 flow is blocked for both ports. The spring return DCV requires the operator or mechanical actuator to hold the valve in positions 1 and 3 to move the actuator, when the operator or actuator releases the DCV from either position the valve returns to position 2 blocking flow to the actuator.

A 3-position non-centering DCV functions similar to the 3-position spring return DCV but does not return to position 2 automatically unless the operator or mechanical actuator moves it. A 2-position DCV acts only for direction control and does not include a "closed" position but rather acts as a switching valve reversing the ports connected to the inlet/outlets of the valve.

In an embodiment, via the use of the HIC, the system can be operated in exactly the same manner as the existing direct acting hydraulic cylinder with any of the DCV valves discussed above since the flow of hydraulic stops once the cylinder reaches the full extent of its travel (extended or retracted).

In previous applications of rotary hydraulic motors using a non-centering DCV without the use of the HIC proposed herein, flow to the hydraulic motor had to be intentionally stopped once the motor or actuator reached the extent of its operational travel. If the valve was not returned to the full closed position fluid would continue to flow through the motor even though the motor would not rotate. In an installation using a standard hydraulic cylinder, this flow would indicate a leak in the system.

With the HIC, a rotary hydraulic motor or actuator can be directly substituted for a standard hydraulic cylinder type without the need to rework existing controls or retrain personnel. See, for example, the discussion below regarding FIGS. 15A, 15B, 15C, 15D.

When the hydraulic control valve is placed in position 1, the hydraulic fluid enters port P1 on the HIC. The fluid then moves the internal floating piston from one end of the cylinder to the other. This forces the swept volume of the hydraulic cylinder out of port P2 before coming to a stop at the opposite end of the hydraulic cylinder.

At this point, the control valve can be left in the open position which maintains pressure in the circuit up to the internal dividing piston, there is no flow through the system at this position because the internal dividing piston has reached the limit of its travel. Pressure upstream of the HIC stabilizes while pressure downstream of the HIC drops to return pressure (approximately 0 psig) This pressure can be observed via pressure transmitter/pressure gauge/pressure switch (e.g., 419) or differential pressure transmitter/differential pressure gauge/differential pressure switch (e.g., 619)

If a flow meter is employed in the system (e.g., 420), it can be installed at any point downstream from the DCV. The flow rate of the system can be observed to determine when the driven member reaches the mechanical stop on the driven side. Once the driven member reaches its mechanical limit, the only flow through the system will be the fluid that internally bypasses the motor rotor. As the rotor is stationary this presents an additional restriction, thus the flow rate decreases though the motor. Flow also decreases throughout the system since the HIC is directly coupled with the fluid elsewhere in the system.

The control valve can then be reversed which sends hydraulic fluid from the control valve to the motor port R1 where it flows through the motor and into port P2 on the HIC. This forces the hydraulic fluid to move the internal dividing piston and forces the swept volume of hydraulic cylinder out of Port P1 before coming to a stop at the opposite end of the hydraulic cylinder.

At this point, the control valve can be left in the close position which maintains pressure in the circuit through the hydraulic motor, up to the internal dividing piston, there is no flow through the system at this position because the internal dividing piston has reached the limit of its travel.

By observing the system pressure on both legs of the DCV, the open or close position of the actuator/motor can be approximated.

Leak detection can be implemented in the system by repressurizing the opposite side of the motor/isolation cylinder. Since the pressure on both sides of the system is balanced and the internal dividing piston is parked, there is no flow through the system. This means the motor will not move. If no leaks are present, the pressure on both sides of the system will be equal and flow will not be detected on the lines to or from the motor.

A manual override provision can be added by adding a second DCV inline with the HIC that bypasses the HIC cylinder to drive the motor directly.

Various advantages of embodiments have been provided herein. Without limitation, advantages include the following.

First, the hydraulic isolation and intermediary cylinder is particularly useful wherever repeatable position control is required but alteration of existing controls are not allowed.

Second, the hydraulic isolator circuit allows the replacement of existing hydraulic cylinder type actuators with simple positive locking worm-drive or lead screw drives for safety critical applications where the loss of hydraulic power could cause unintended load loss.

Various embodiments are possible.

The internal dividing piston could be setup to use air/nitrogen on one side of the piston and hydraulic fluid on the other side. For example, see FIG. 10.

A dual isolation system may be used to completely isolate the actuation circuit from the drive circuit. This mitigates potential leakage by allowing the drive circuit to be maintained at minimal pressure except when the system is actuated. For example, see FIG. 7.

When two HICs are used (e.g., FIG. 7), the system may use different types or non-compatible hydraulic fluids on either side of the internal dividing piston. This allows the rotary motor to operate on the hydraulic fluid required for the motor more efficiently without creating a completely different hydraulic circuit.

FIGS. 12A-15D are now addressed.

Figure 12A:
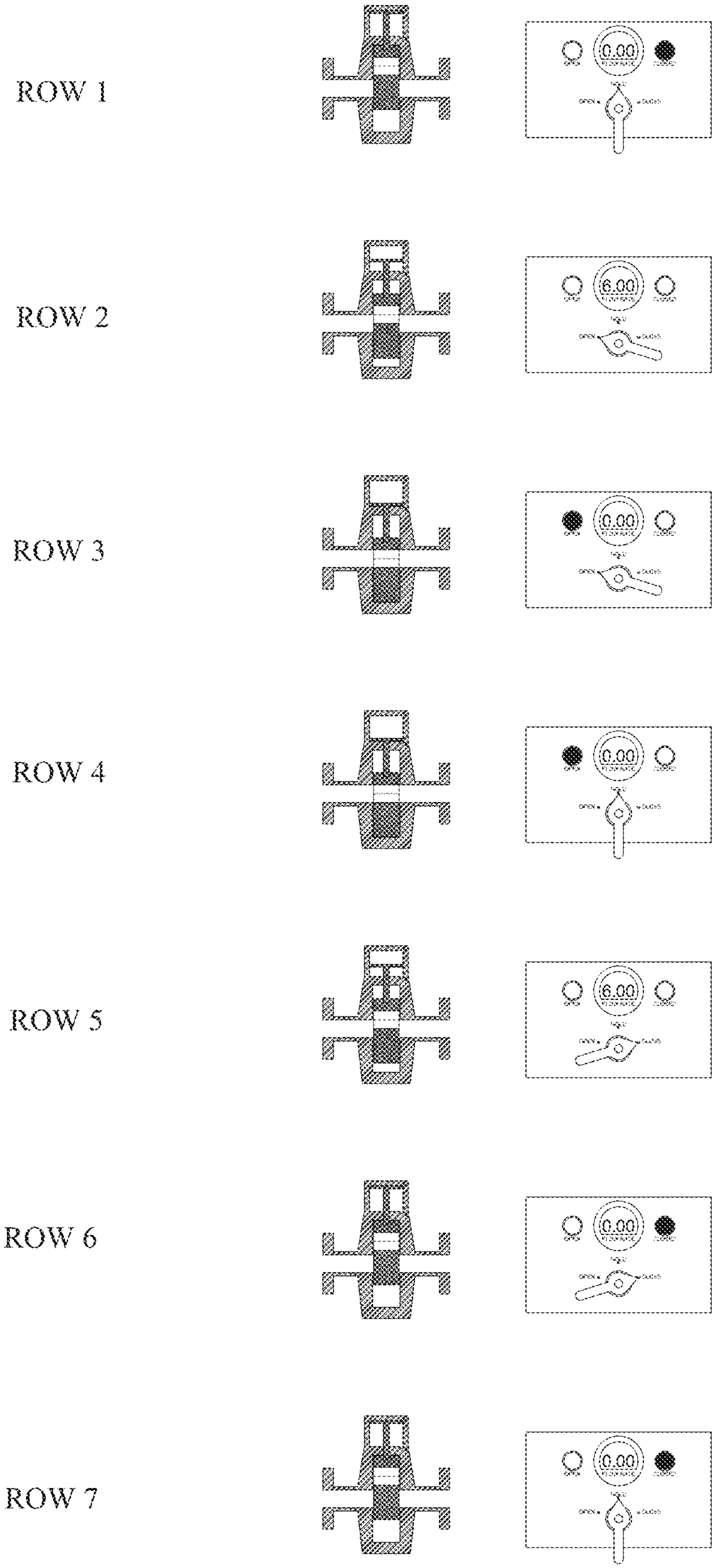
FIGS. 12A, 12B, and 12C address conventional hydraulic axial piston actuators with various forms of directional control valves (DCVs).
Figure 12B:
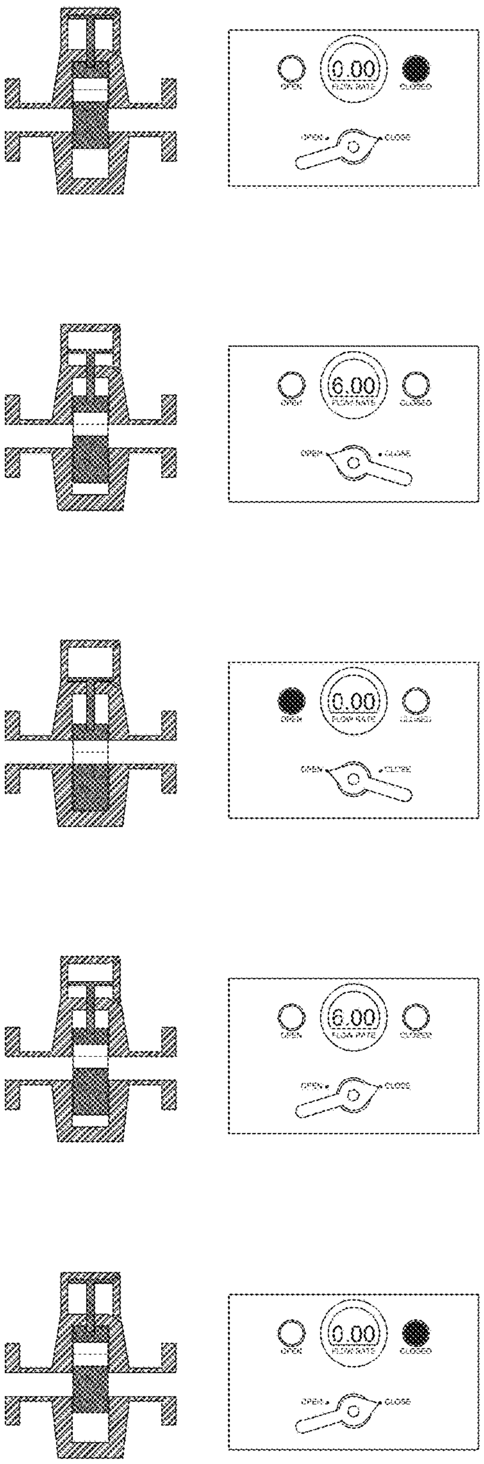
Figure 12C:
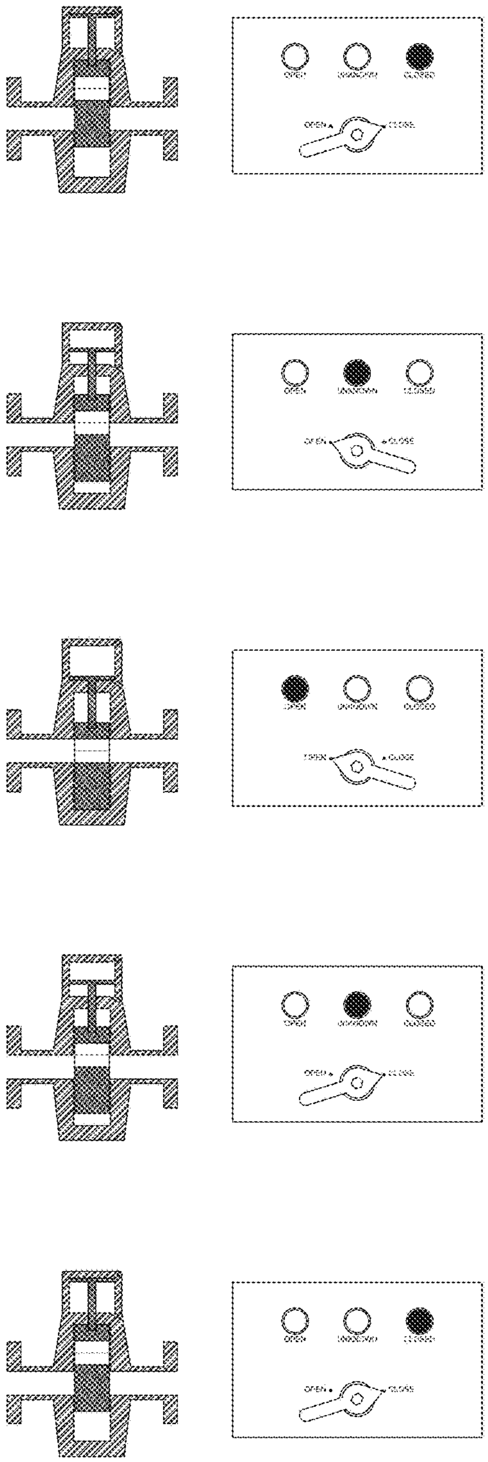

FIGS. 12A, 12B, and 12C address conventional hydraulic axial piston actuators with various forms of directional control valves (DCVs).

In FIG. 12A, Row 1 shows a gate valve closed and no flow in the drive circuit considering the 3 position DCV is in "hold" and reads "closed". Row 2 shows a transition state with fluid flow in the drive circuit and neither "open" nor "closed" indicated. Row 3 shows "open" indicated and the drive circuit with no flow. This is maintained in the "hold" position at Row 4. Row 5 shows a transition state with fluid flow in the drive circuit and neither "open" nor "closed" indicated. Row 6 shows "close" indicated and the drive circuit with no flow. This is maintained in the "hold" position at Row 7.

In FIG. 12B, Row 1 shows a gate valve closed and no flow in the drive circuit consider the 2 position DCV is in "close" position and reads "closed". Row 2 shows a transition state with fluid flow in the drive circuit and neither "open" nor "closed" indicated. Row 3 shows "open" indicated and the drive circuit with no flow. Row 4 shows a transition state with fluid flow in the drive circuit and neither "open" nor "closed" indicated. Row 5 shows "close" indicated and the drive circuit with no flow.

In FIG. 12C, Row 1 shows a gate valve closed and no flow in the drive circuit consider the 2 position DCV is in "closed" position and reads "closed". Row 2 shows a transition state with fluid flow in the drive circuit and "unknown" indicated. Row 3 shows the "open" position, "open" indicated, and the drive circuit with no flow. Row 4 shows a transition state with fluid flow in the drive circuit and "unknown" indicated. Row 5 shows "closed position" and "close" indicated and the drive circuit with no flow.

Figures 1, 13B:
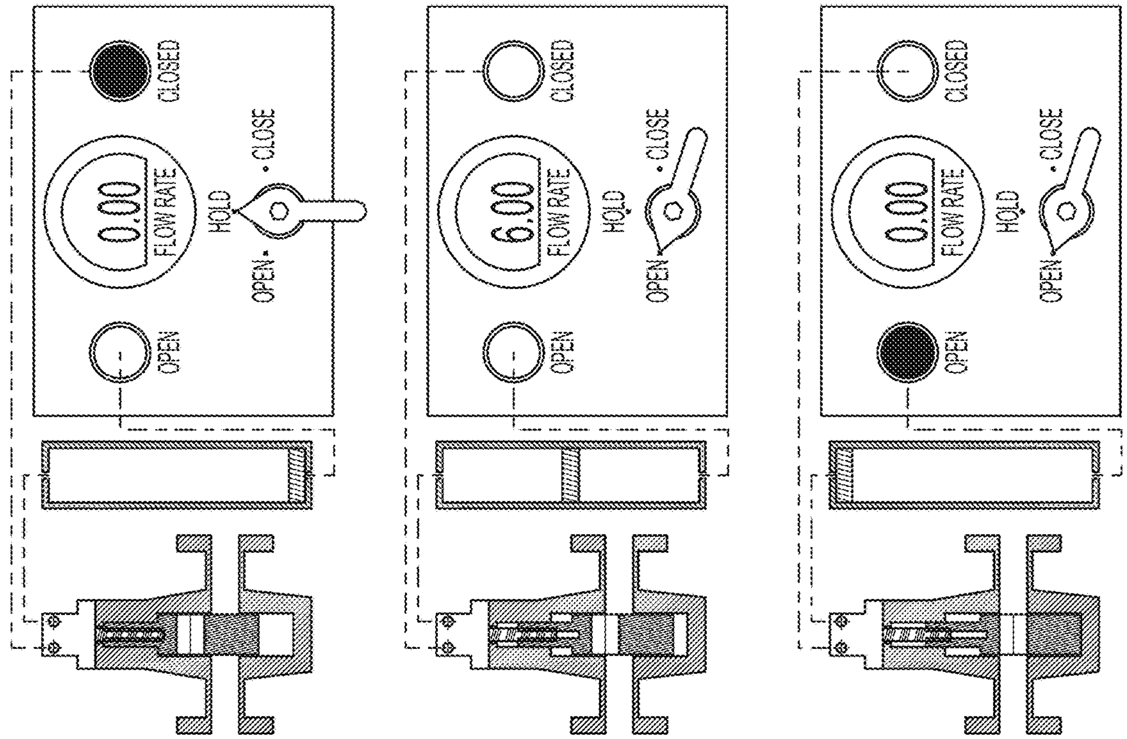
FIGS. 13A-1, 13A-2, 13A-3 and 13B-1, 13B-2, 13B-3 address 3 position DCVs with hydraulic rotary actuators.
Figures 1, 13A:
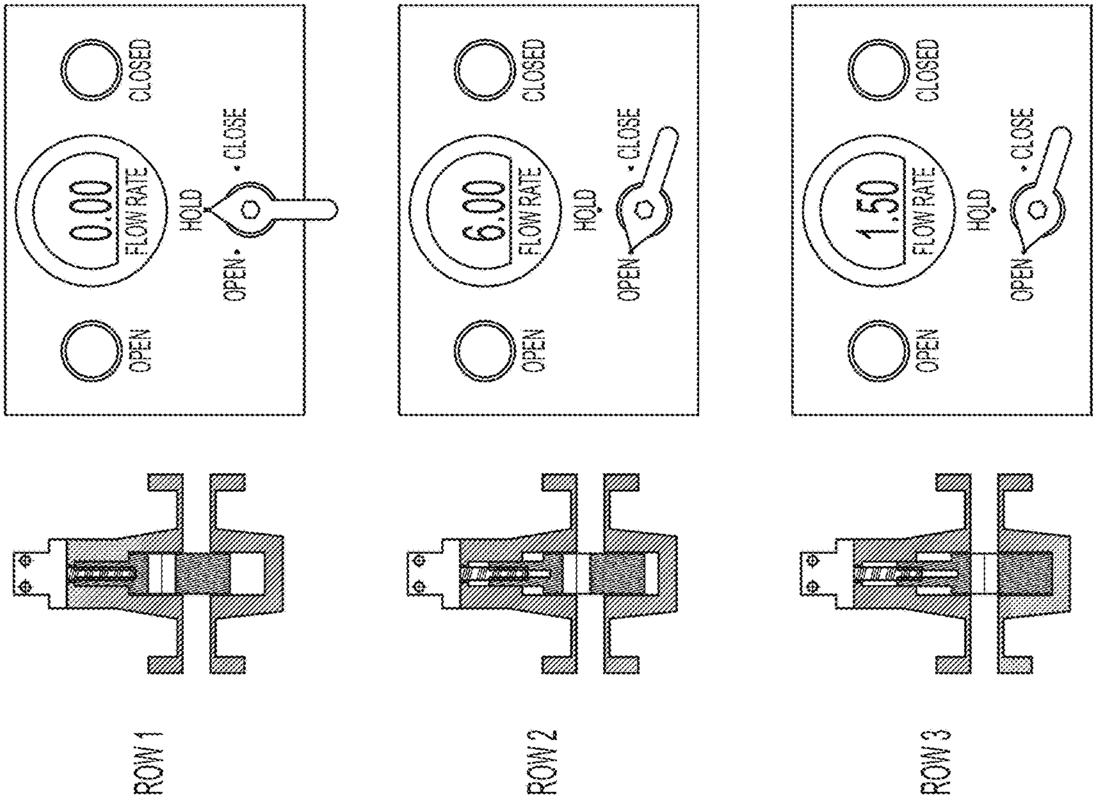
Figures 2, 13A:
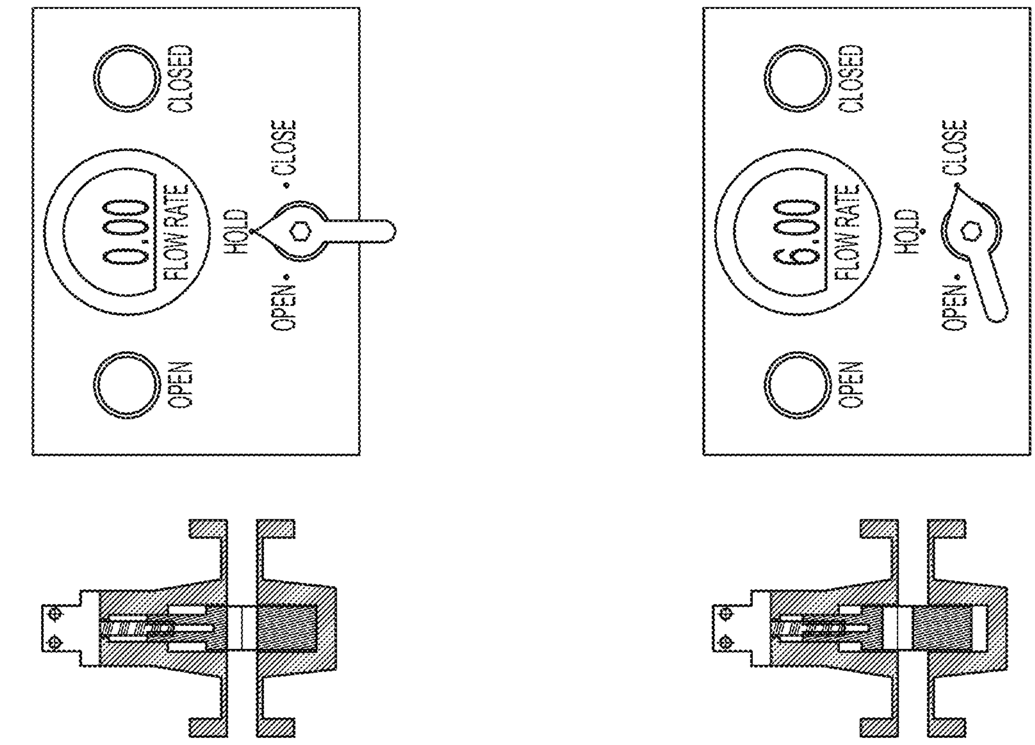
Figures 2, 13B:
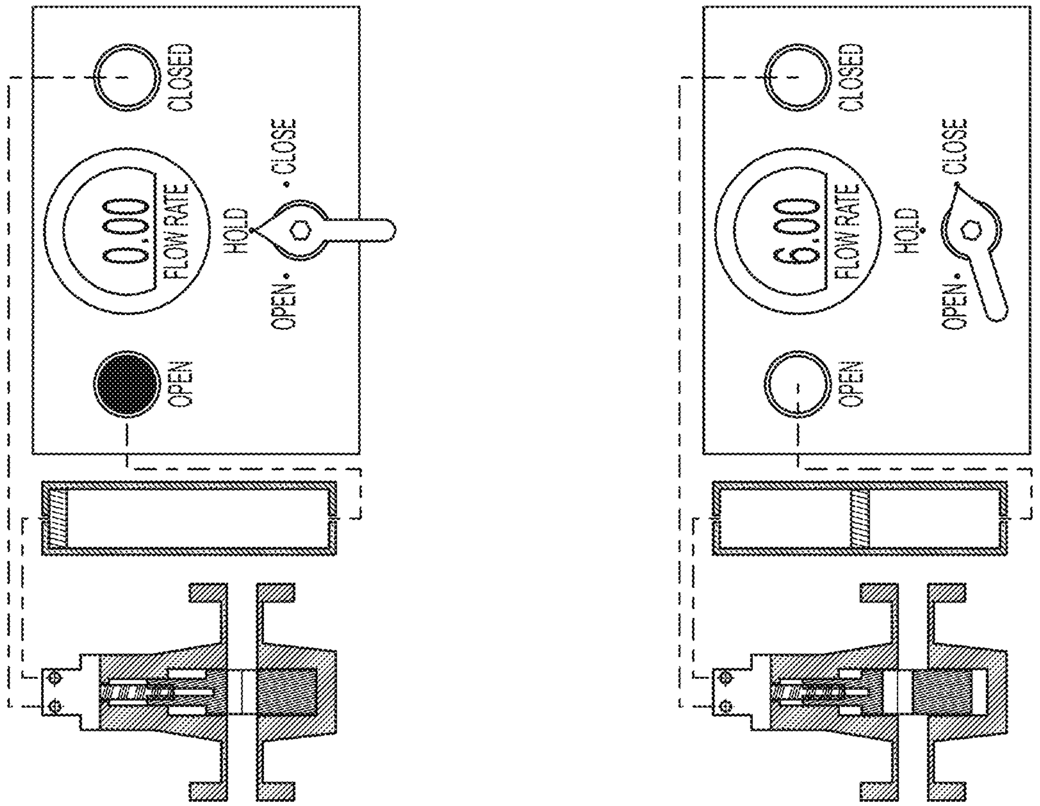
Figures 3, 13B:
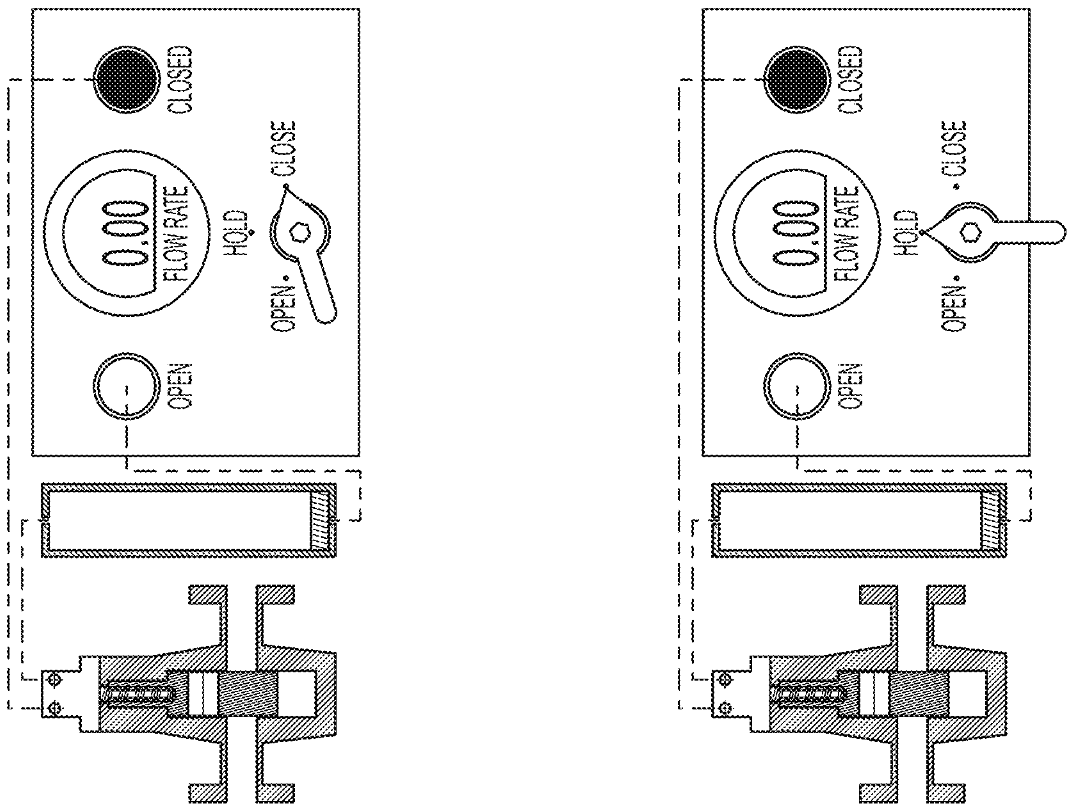
Figures 3, 13A:
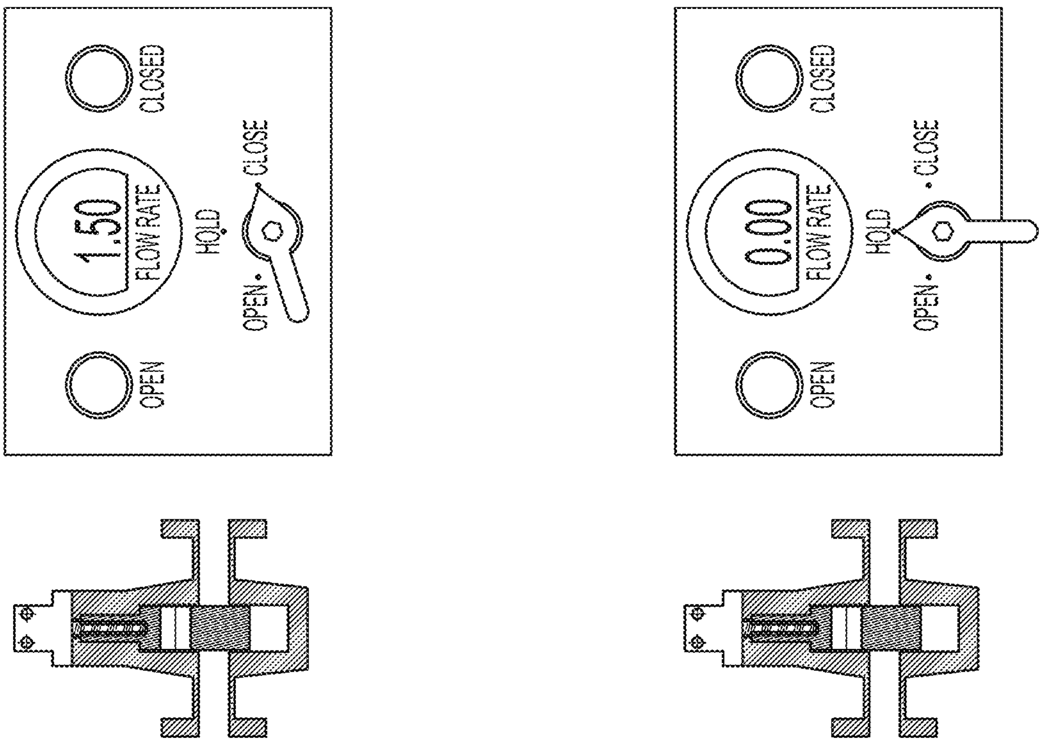

FIGS. 12A-12C address normal operation with standard DCVs paired with linear piston actuators. However, FIGS. 13A-1, 13A-2, 13A-3 take the same DCV from FIG. 12A and replace the linear piston actuator with a hydraulic rotary actuator. In FIG. 13A-1, Row 1 shows a gate valve closed and no flow in the drive circuit considering the 3 position DCV is in "hold". However, the DCV does not read "closed" as in FIG. 12A due to case leakage in the rotary actuator. This is problematic and will be addressed with an HIC in FIGS. 13B-1, 13B-2, 13B-3. In FIG. 13A-1, Row 2 shows a transition state with fluid flow in the drive circuit and neither "open" nor "closed" indicated. Row 3 fails to show "open" indicated despite the drive circuit having no flow. Again, this is problematic as the indicator should indicate "open". This erroneous indication is maintained in the "hold" position at Row 4. Row 5 shows a transition state with fluid flow in the drive circuit and neither "open" nor "closed" indicated. Row 6 fails to show "closed" indicated despite the drive circuit having no flow. This erroneous state is maintained in the "hold" position at Row 7.

The HIC system of FIGS. 13B-1, 13B-2, 13B-3 addresses these issues found in FIGS. 13A-1, 13A-2, 13A-3. FIGS. 13B-1, 13B-2, 13B-3 take the same DCV from FIG. 12A and replace the linear piston actuator with a hydraulic rotary actuator and adds an HIC. In FIG. 13B-1, Row 1 shows a gate valve closed and no flow in the drive circuit considering the 3 position DCV is in "hold". The DCV reads "closed" as in FIG. 12A despite case leakage in the rotary actuator. The HIC prevents any case leakage from becoming problematic. Row 2 shows a transition state with fluid flow in the drive circuit and neither "open" nor "closed" indicated. Row 3 shows "open" indicated considering the drive circuit has no flow beyond leakage. This correct indication is maintained in the "hold" position at Row 4. Row 5 shows a transition state with fluid flow in the drive circuit and neither "open" nor "closed" indicated. Row 6 shows "closed" considering the drive circuit has no flow beyond some possible leakage. This state is maintained in the "hold" position at Row 7.

Figure 14A:
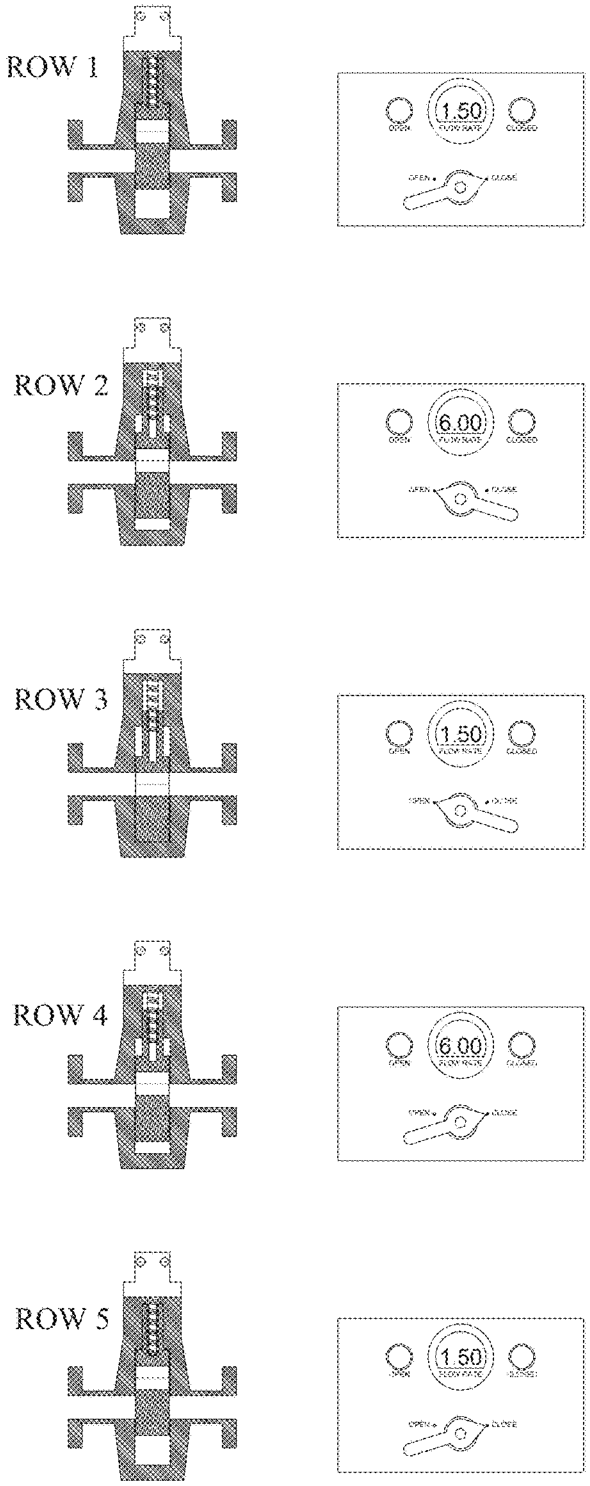
FIGS. 14A, 14B, 14C, 14D address various DCVs with hydraulic rotary actuators.
Figure 14B:
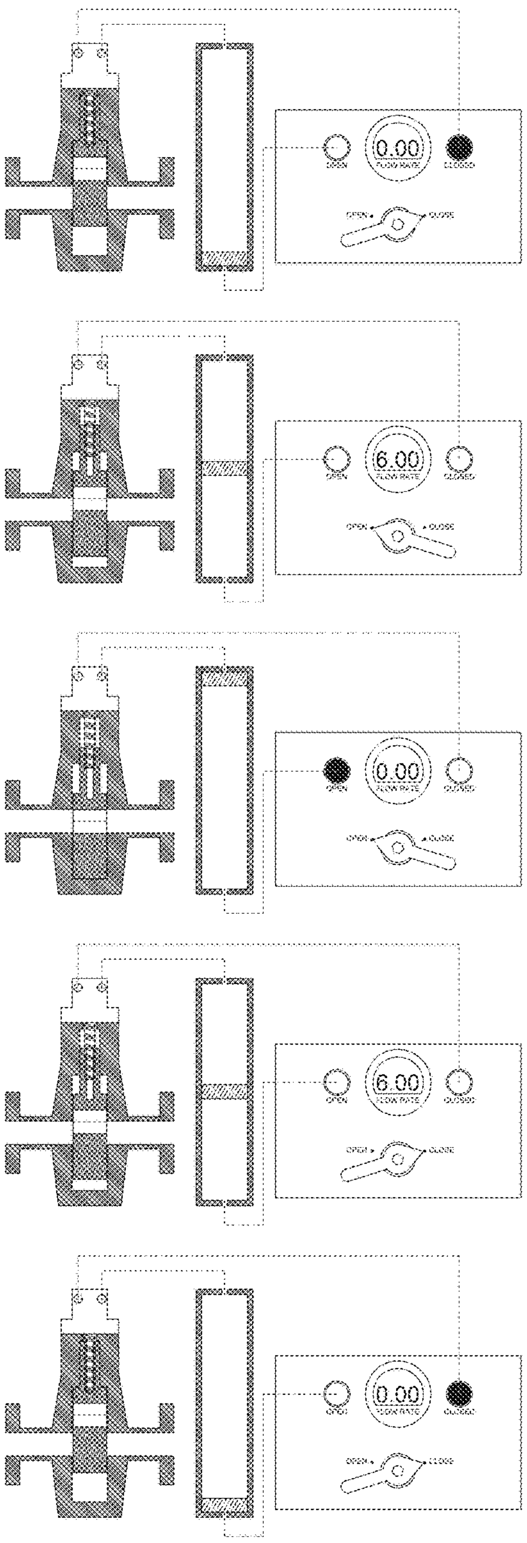
Figure 14C:
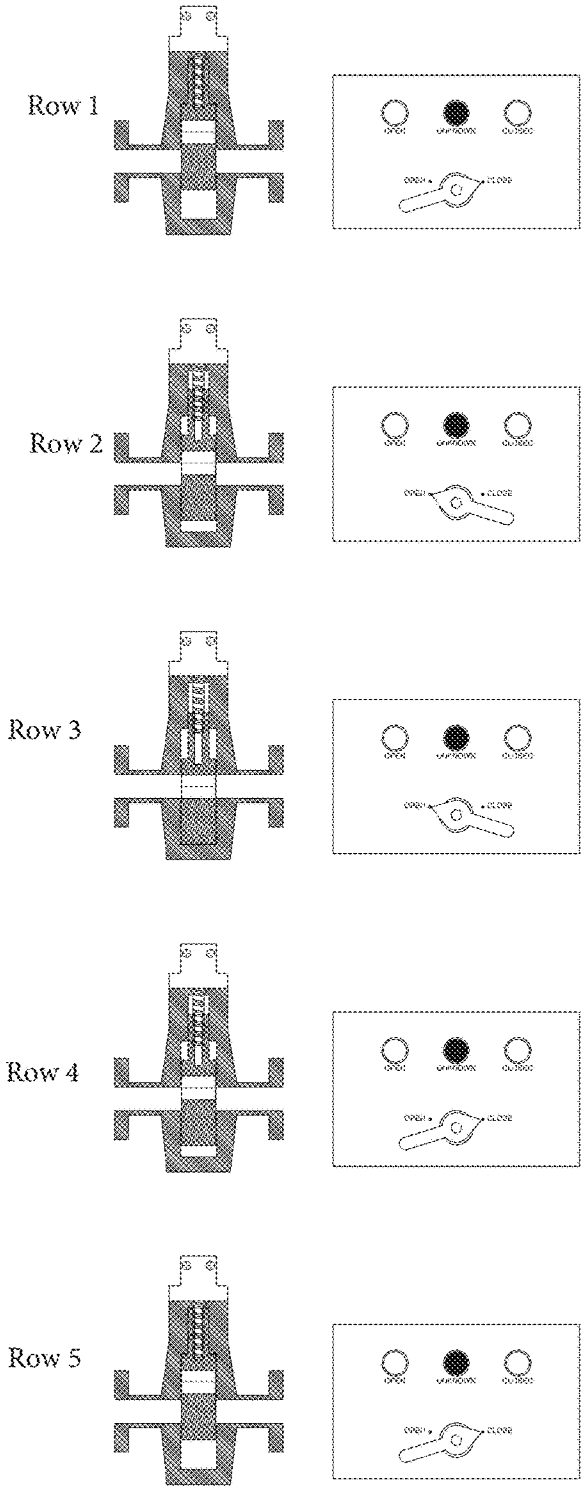
Figure 14D:
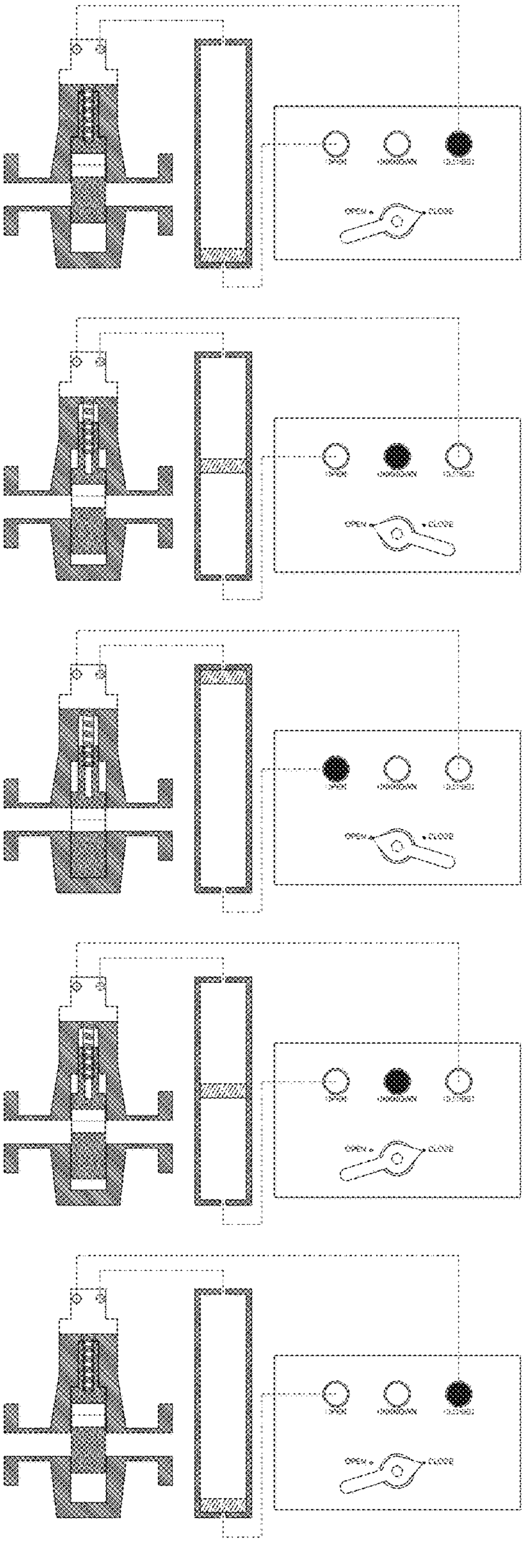
Figure 15A:
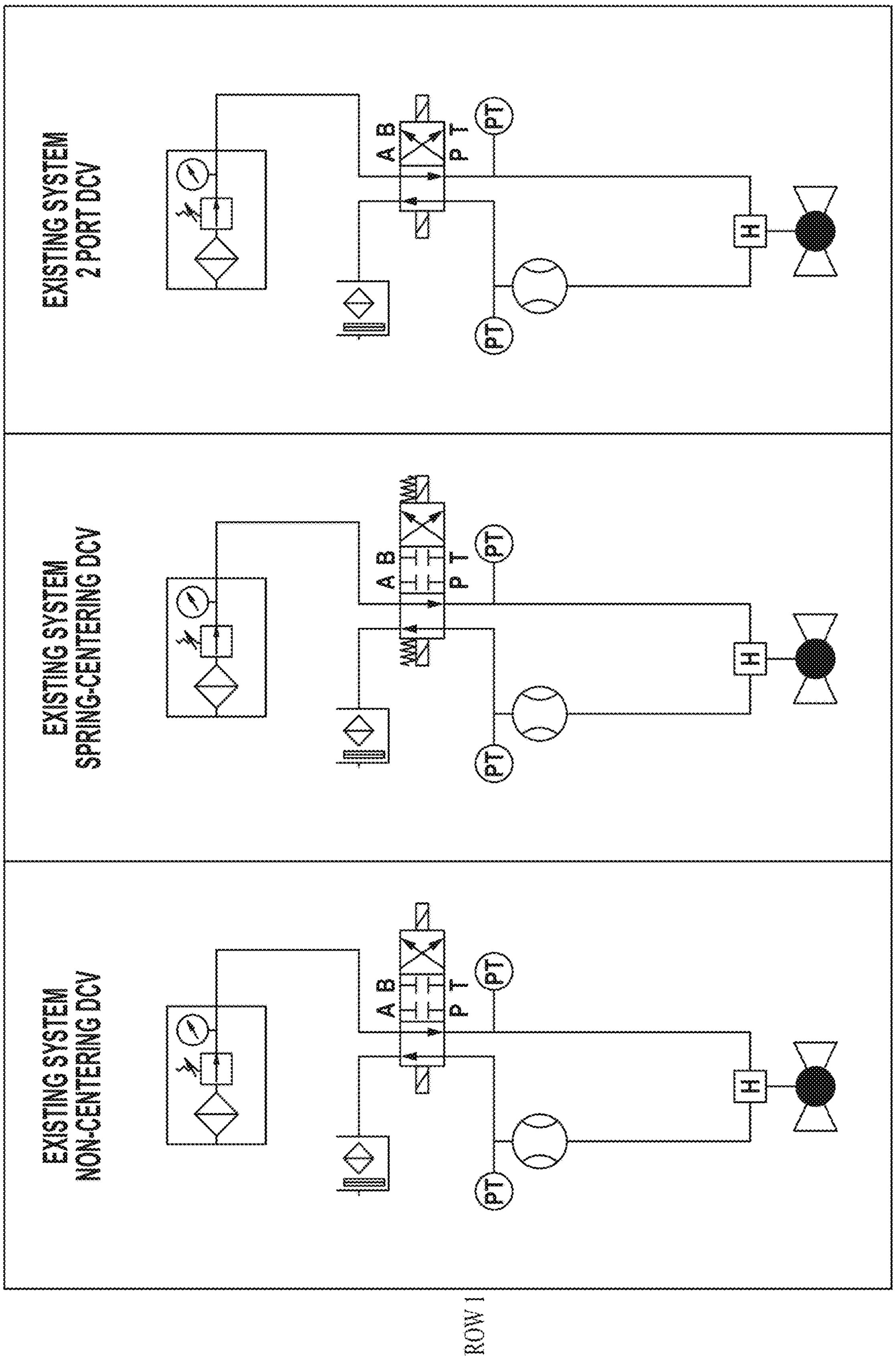
FIGS. 15A, 15B, 15C, 15D show three methods for converting DCV/conventional hydraulic axial piston actuator systems into DCV/hydraulic rotary actuator systems.
Figure 15B:
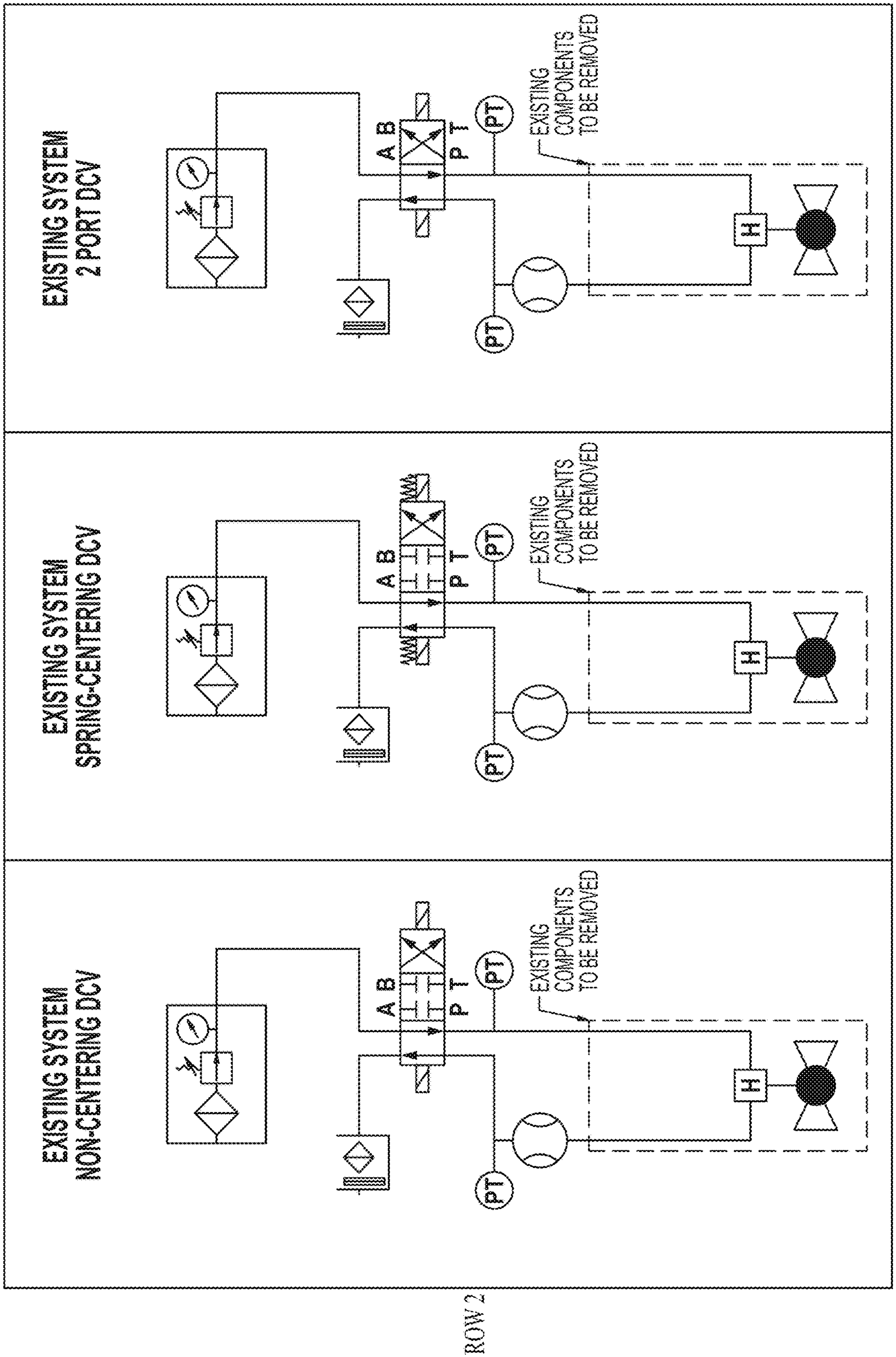
Figure 15C:
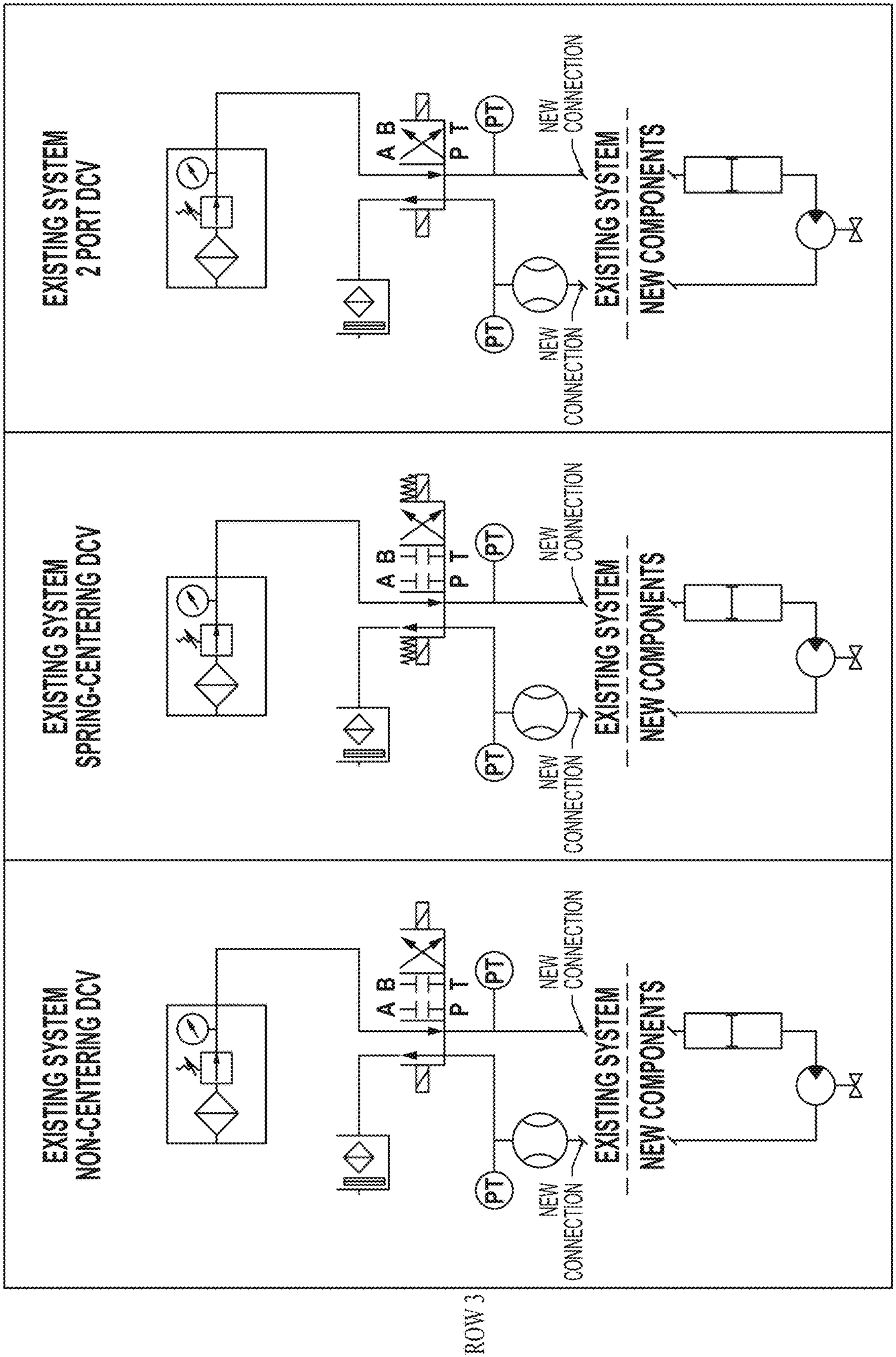
Figure 15D:
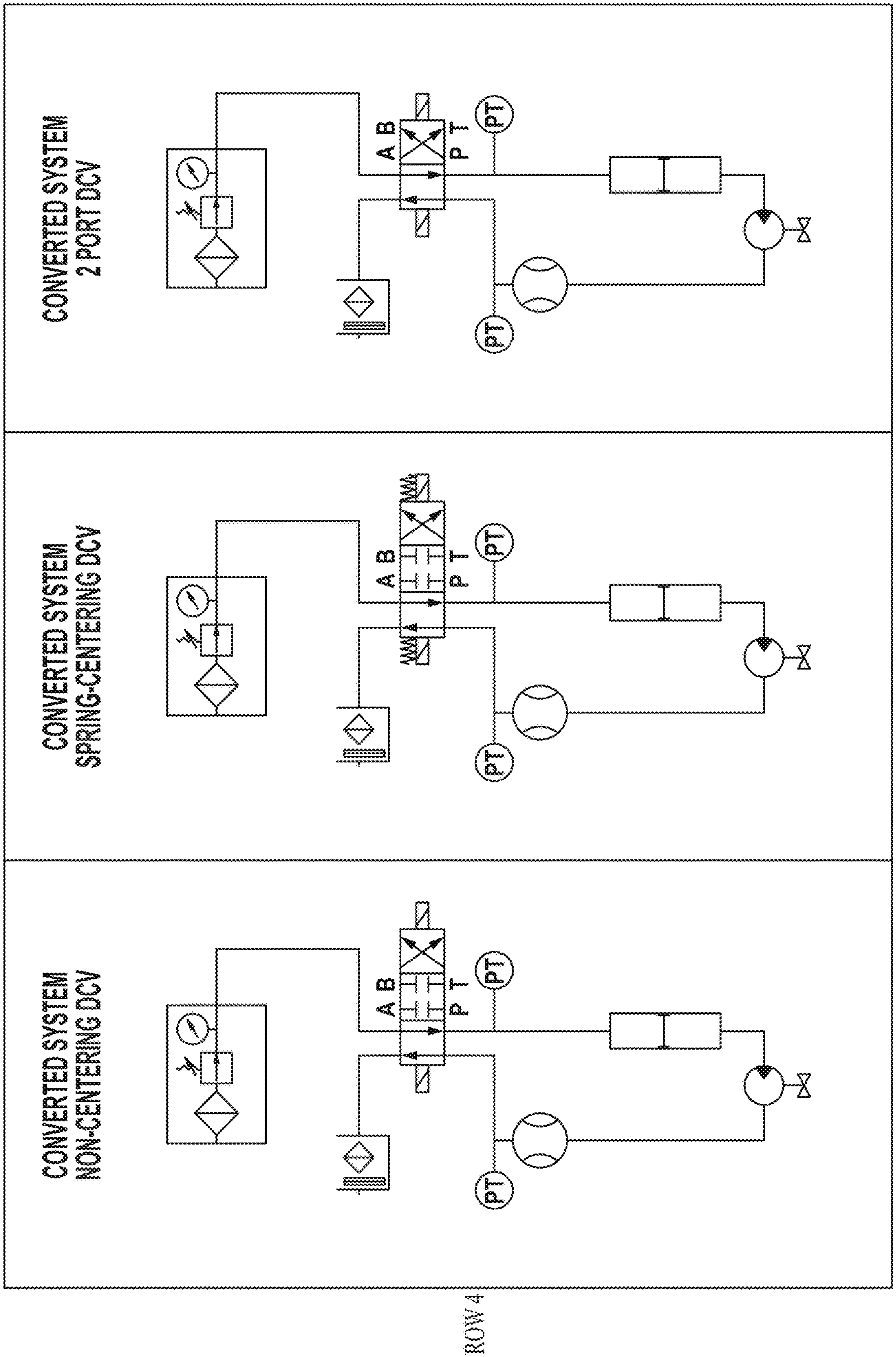

FIGS. 14A and 14C show similar errors to those addressed in FIGS. 13A-1, 13A-2, 13A-3 but for differing DCVs. FIGS. 14B and 14D show similar respective solutions to the errors in FIGS. 14A and 14C based on inclusion of an HIC in the hydraulic system.

FIGS. 15A, 15B, 15C, 15D show three methods for converting DCV/conventional hydraulic axial piston actuator systems into DCV/hydraulic rotary actuator systems. Each column in FIGS. 15A, 15B, 15C, 15D focuses on a different form of DCV. The first column addresses a non-centering DCV, the second column addresses a spring-centering DCV, and the third column addresses a 2 port DCV. Row 1 addresses hydraulic systems with hydraulic linear piston actuators (H) and ball valves. Rows 2 and 3 show the hydraulic linear piston actuators and ball valves can be exchanged with an HIC and rotary actuator-all without changing the DCV (and all without having to retrain operators who are used to operating the DCV in manners consistent with, for example, FIGS. 12A, 12B, 12C). Row 4 shows the fully converted systems. While Rows 3 and 4 show a single HIC embodiment, other embodiments may employ multiple HICs with one on each side of the actuator.

Various examples now follow.

Example 1. A system comprising: a hydraulic fluid source (401, 501, 601, 701, 801, 901, 1001, 1101); a first cylinder (402, 502, 602, 702, 802, 902, 1002, 1102) including a first piston (403, 503, 603, 703, 803, 903, 1003, 1103); a first hydraulic fluid line (404, 504, 604, 704, 804, 904, 1004, 1104) coupling the hydraulic fluid source to the first cylinder, the first hydraulic fluid line including a first hydraulic fluid; a rotary hydraulic motor (405, 505, 605, 705, 805, 905, 1005, 1105) having an output shaft that is an actuator (406, 506, 606, 706, 806, 906, 1006, 1106); a second hydraulic fluid line (407, 507, 607, 707, 807, 907, 1007, 1107) coupling the first cylinder to the rotary hydraulic motor, the second hydraulic fluid line including a second hydraulic fluid.

See, for example, FIGS. 4-11. Other components in the system include a hydraulic return tank (421, 521, 621, 721, 821, 921, 1021, 1121), hydraulic accumulator 1025, and check valve 1026.

Such an embodiment uses a HIC to allow fluid movement through the driven member (e.g., rotary hydraulic motor) without fluid passing between the control side (line 804) and the driven side (line 817) of the hydraulic circuit.

Example 2. The system of example 1 wherein the rotary hydraulic motor includes one of a vane motor, a gerotor motor, a gerotor motor, or combinations thereof.

In other embodiments, the hydraulic motor is not necessarily a rotary hydraulic motor but may instead be at least one of a gear motor, an axial piston/swash plate motor, a bent axis motor, a radial piston motor, or combinations thereof.

Example 3. The system according to any of examples 1-2, wherein the first hydraulic fluid is a gas and the second hydraulic fluid is a liquid.

Example 4. The system according to any of examples 1-2, wherein the first hydraulic fluid is a liquid and the second hydraulic fluid is a gas.

Another version of Example 4: The system according to any of examples 1-2, wherein the first hydraulic fluid has a first viscosity; the second hydraulic fluid has a second viscosity; the first viscosity is unequal to the second viscosity.

Example 5. The system according to any of examples 1-4, wherein the first cylinder has a variable volume (208, 208') in which the first piston is configured to travel.

For example, see FIGS. 2A-2C.

Example 6. The system of example 5, wherein the first cylinder includes a platform (209) that travels between one end of the first cylinder and the first piston to vary a volume (208) between the platform and the first piston.

Example 7. The system of example 6, wherein the platform includes at least one channel (210) that traverses the platform.

Example 8. The system according to any of examples 1-7, wherein the first and second hydraulic fluids are isolated from one another.

Example 9. The system of example 8, wherein the second hydraulic fluid is at least partially included in the rotary hydraulic motor.

Another version of example 9. The system of example 8, wherein the second hydraulic fluid is at least partially included in both the first piston and the rotary hydraulic motor.

Another version of example 9. The system of example 8, wherein the first cylinder includes both of the first and second hydraulic fluids.

Example 10. The system according to any of examples 1-9, wherein: the first cylinder includes first (1011, 1111) and second ends (1012, 1112) that oppose one another; the first cylinder includes a resilient member (1013, 1113) that biases the first piston towards one of the first and second ends of the first cylinder.

A resilient member may include, for example, a spring. See, for example, Problem 4 addressed above.

Another version of example 10: The system according to any of examples 1-9 comprising a first isolated chamber within the first cylinder, wherein: the first cylinder includes first and second ends that oppose one another; the first isolated chamber includes a compressible gas (1013); the isolated compressible gas biases the first piston towards one of the first and second ends of the first cylinder.

Such an embodiment may include, for example, internal piston stop 1024.

Example 11. The system according to any of examples 1-10 comprising: a second cylinder (414, 514, 614, 714, 814, 815, 816, 914, 915, 916, 1014, 1015, 1114, 1115) including a second piston; wherein the second cylinder is coupled in series with the first cylinder.

In an embodiment, the first and second cylinders have equal stroke volumes to each other. However, other embodiments are not similarly limited.

Example 12. The system of example 11, wherein: the first piston includes a first surface area taken orthogonal a first axis the first piston traverses; the second piston includes a second surface area taken orthogonal a second axis the second piston traverses; first and second axes are parallel to each other; the first surface area is unequal to the second surface area.

For example, see FIGS. 8-11. Pistons may be coupled to each other with a piston connecting rod (822, 922, 1022, 1122). See, for example, Problem 5 addressed above.

Example 13. The system according to any of examples 1-10 comprising a second cylinder including a second piston, wherein: the rotary hydraulic motor has first and second ports that respectively input and output the second hydraulic fluid; the second hydraulic fluid line couples the first cylinder to the first port of the rotary hydraulic motor; a third hydraulic fluid line (417, 517, 617, 717, 817, 917, 1017, 1117) couples the second cylinder to the rotary hydraulic motor, the third hydraulic fluid line including the second hydraulic fluid.

Example 14. The system of example 13, wherein: the second cylinder includes first and second ends that oppose one another; the second cylinder includes a resilient member that biases the second piston towards one of the first and second ends of the second cylinder.

Another version of example 14: The system of example 13 comprising a second isolated chamber within the second cylinder, wherein: the second cylinder includes first and second ends that oppose one another; the second isolated chamber includes a compressible gas; the isolated compressible gas biases the first piston towards one of the first and second ends of the first cylinder.

Example 15. The system according to any of examples 13-14, wherein: the second hydraulic fluid is at least partially included in the first piston; the second hydraulic fluid is at least partially included in the rotary hydraulic motor; the second hydraulic fluid is at least partially included in the second piston.

Such an embodiment may couple, for example, a gate valve to the rotary hydraulic motor. The first or second pistons may specifically avoid intermediate positions that could lead to undesirable intermediate positions in the gate valve.

Embodiments including two or more HICs have serval use cases. A first use case is for when the hydraulic fluid in the control system is incompatible with the fluid requirements of the motor. For example, the first and second hydraulic fluids of example 1 may be incompatible. A second use case is to eliminate leak points. With one HIC the motor is un-pressurized in one position but pressurized when reversed. With two HICs as in example 13 the motor can be unpressurized except when moving. This may provide a way to prolong seal life for remote systems and minimize potential fluid leakage through piping and hoses.

See, for example, Problem 3 described above regarding the need for different hydraulic fluids in, for example, the first and second hydraulic lines of example 1.

Example 16. The system according to any of examples 1-15 comprising a directional control valve (418, 518, 618, 718, 818, 918, 1018, 1118), wherein: the directional control valve is coupled between the hydraulic fluid source and the first cylinder; the directional control valve is coupled between the hydraulic fluid source and the second cylinder.

Example 17. The system according to any of examples 1-16, wherein: the first hydraulic fluid is incompressible; the second hydraulic fluid is incompressible.

Example 18. The system according to any of examples 1-17 comprising a bypass valve (523, 723), wherein the bypass valve is coupled between the hydraulic fluid source and the first cylinder.

Example 19. The system of example 18, wherein the bypass valve includes a bypass circuit to route the second hydraulic fluid to bypass the first cylinder.

Figure 7:
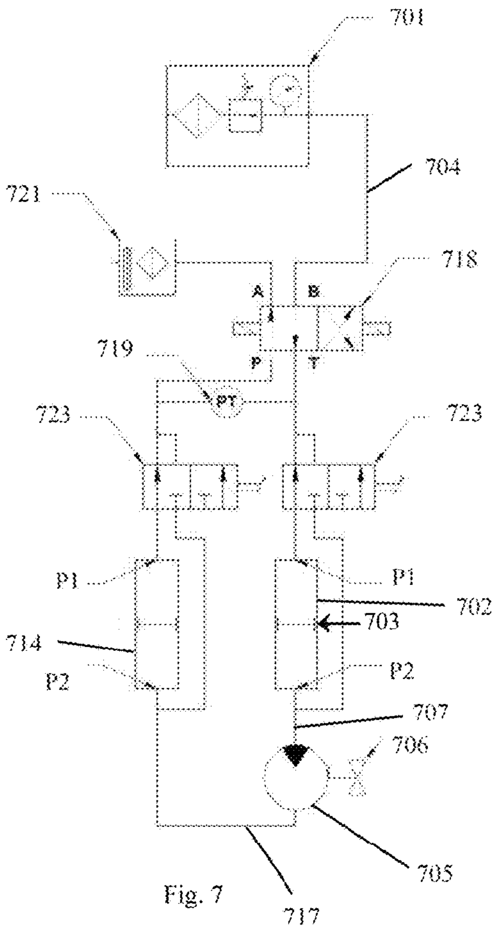
Figure 9:
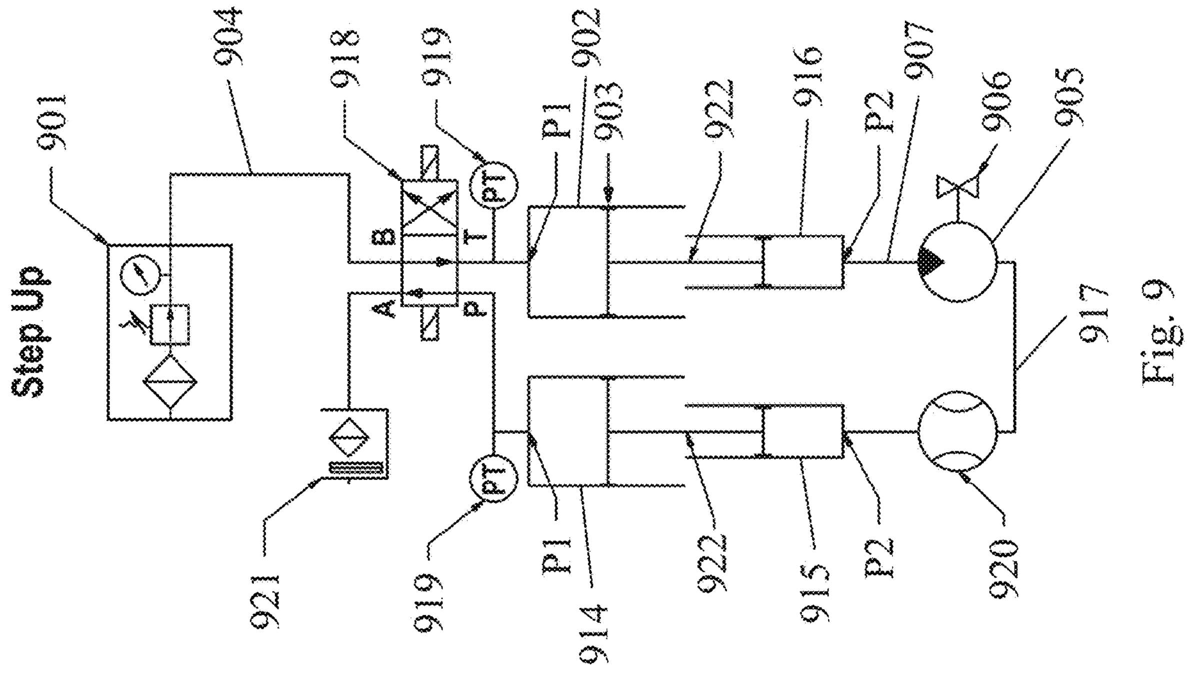
FIGS. 8 and 9 show piping and instrumentation diagrams for step-down and step up HIC systems.
Figure 8:
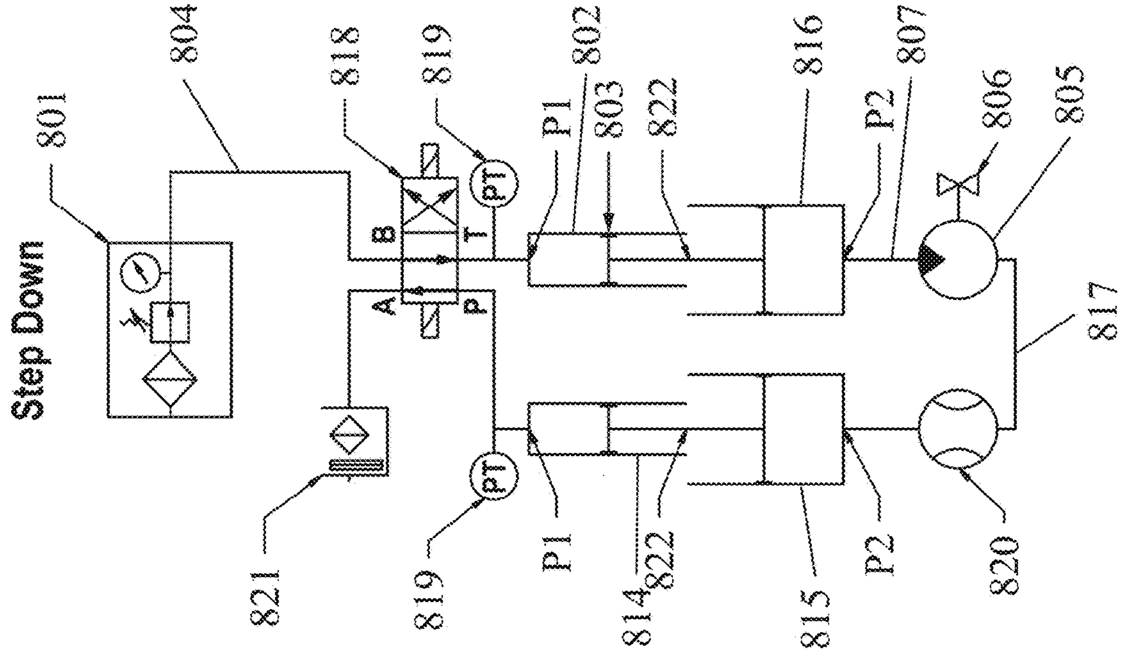
Figure 10:
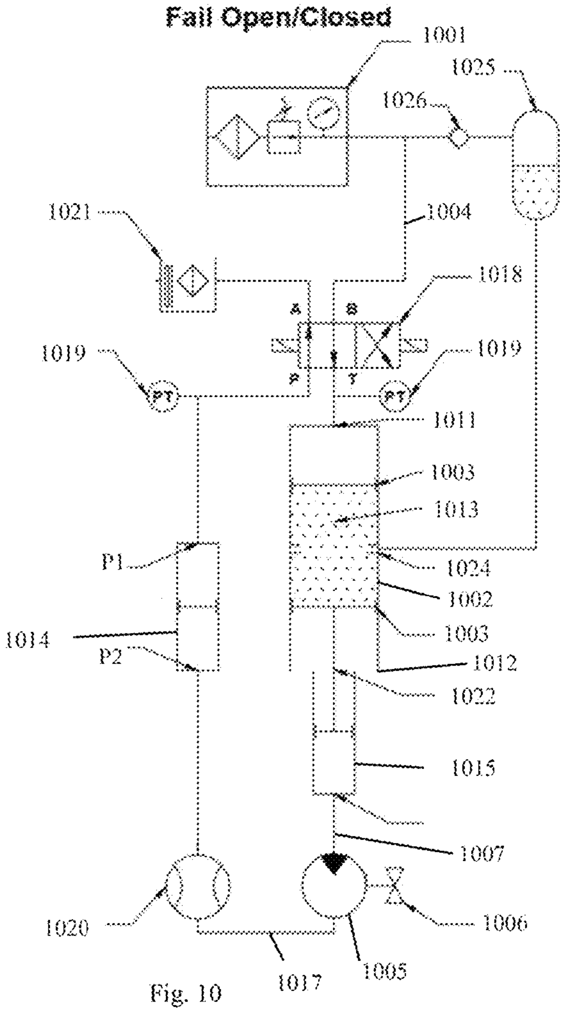
FIGS. 10 and 11 show piping and instrumentation diagrams of various arrangements for fail open/closed HIC systems.
Figure 11:
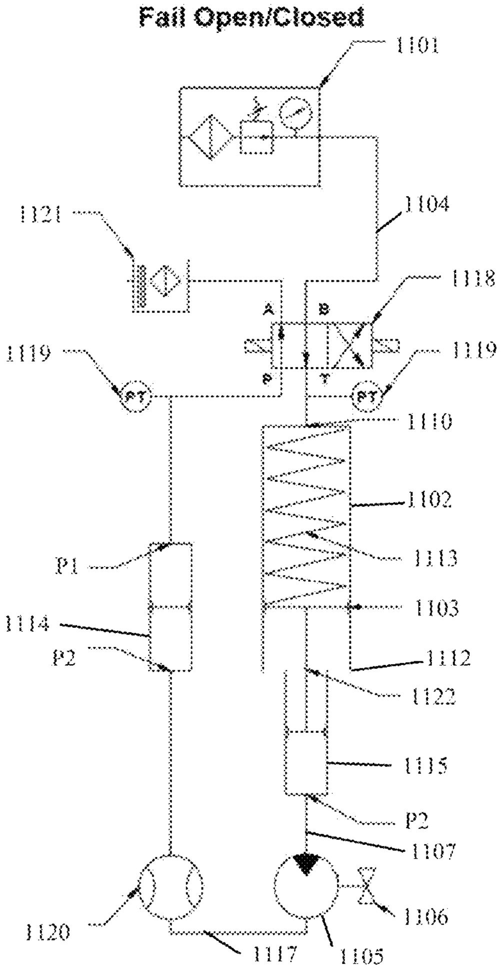

For example, see FIG. 7.

Example 20. The system according to any of examples 1-19, wherein the rotary hydraulic motor has case leakage.

Example 21. The system of example 20, wherein the case leakage is between 0.5% and 3.0% of flow of the second hydraulic fluid through the rotary hydraulic motor.

Example 22. The system according to any of examples 1-21, wherein the hydraulic fluid source includes a hydraulic power unit.

Example 23. The system according to any of examples 1-22 comprising a directional control valve (418, 518, 618, 718, 818, 918, 1018, 1118), wherein the directional control valve is coupled between the hydraulic fluid source and the first cylinder.

Example 24. The system of example 23, wherein the directional control valve is at least one of a 3 position spring return directional control valve, a 3 position non-centering directional control valve, a 2-position directional control valve, or combinations thereof.

See, for example, the description above regarding Problem 1 and the issues with DCV systems that are switched from conventional hydraulic axial piston actuators to hydraulic rotary actuators.

Example 25. The system of example 23, wherein the directional control valve is a non-centering directional control valve.

Example 26. The system of example 23, wherein the directional control valve is 2 position directional control valve.

Example 27. The system according to any of examples 23-27, wherein: in a first orientation the directional control valve is configured to allow the first and second pistons to simultaneously travel respectively within the first and second cylinders in response to the first hydraulic fluid flowing in the first hydraulic fluid line; in a second orientation the directional control valve is configured to disallow the first and second pistons from simultaneously traveling respectively within the first and second cylinders.

Example 28. The system of example 27, wherein: the directional control valve includes channel; in the first orientation the channel is open and in the second orientation the channel is closed.

Example 29. The system according to any of examples 1-28 comprising at least one pressure sensor (419, 519, 619, 719, 819, 919, 1019, 1119).

More generally, the pressure sensor may include any of a pressure transmitter, pressure gauge, pressure switch, or combinations thereof.

Example 30. The system according to any of examples 1-29 comprising at least one flow sensor (420, 520, 620, 820, 920, 1020, 1120).

Such as sensor may include, for example, a hydraulic flow meter.

Example 31. The system according to any of examples 1-30, wherein: the first cylinder is located above water; the rotary hydraulic motor is located underwater.

For example, the motor may be used in a sub-sea operation and the cylinder may be located above the sea surface in a manner whereby an operator may note the first piston position within the first cylinder. See, for example, Problem 2 described above.

Example 31. The system according to any of examples 1-30, wherein the first cylinder is located at least 50 meters from the rotary hydraulic motor.

Example 32. The system according to any of examples 1-31 comprising a valve, wherein the actuator is coupled to the valve.

Example 33. The system according to any of examples 1-31 comprising a valve, wherein the actuator is operatively coupled to the valve to open and close the valve.

In an embodiment, the valve is a gate valve, a ball valve, or the like.

Example 34. The system according to any of examples 32-33 wherein the valve is configured to fully open in response to the first piston traversing from one end of the first cylinder to an opposing end of the first cylinder.

In other words, there are no intermediate steps for this embodiment of the HIC. As a result, a user can simply move a DCV to "open" and then walk away from the DCV knowing that one action is enough to fully open the valve.

Example 35. A method according to any of examples 32-34 comprising: interfacing a system including: (a) the hydraulic fluid source (401, 501, 601, 701, 801, 901, 1001, 1101), (b) a directional control valve (DCV); (c) a hydraulic axial piston actuator, and (d) the valve; wherein the DCV and hydraulic axial piston actuator are coupled to the hydraulic fluid source and the hydraulic axial piston actuator is coupled to the valve; operating the DCV to actuate the hydraulic axial piston actuator to open or close the valve; replacing the hydraulic axial piston actuator with the rotary hydraulic motor (405, 505, 605, 705, 805, 905, 1005, 1105); coupling the output shaft rotary hydraulic motor to one of the valve or an additional valve; coupling the first cylinder (402, 502, 602, 702, 802, 902, 1002, 1102) including the first piston (403, 503, 603, 703, 803, 903, 1003, 1103) to the DCV and to the rotary hydraulic motor, wherein the first cylinder is between the DCV and to the rotary hydraulic motor; operating the DCV to actuate the rotary hydraulic motor to open or close the one of a valve or an additional valve.

Examples 36-39 are intentionally omitted.

Example 40. A method comprising: interfacing a system including: (a) a hydraulic fluid source (401, 501, 601, 701, 801, 901, 1001, 1101), (b) a directional control valve (DCV); (c) a hydraulic axial piston actuator, and (d) a valve; wherein the DCV and hydraulic axial piston actuator are coupled to the hydraulic fluid source and the hydraulic axial piston actuator is coupled to the valve; operating the DCV to actuate the hydraulic axial piston actuator to open or close the valve; replacing the hydraulic axial piston actuator with a rotary hydraulic motor (405, 505, 605, 705, 805, 905, 1005, 1105) having an output shaft that is an actuator (406, 506, 606, 706, 806, 906, 1006, 1106); coupling the output shaft to one of a valve or an additional valve; coupling a first cylinder (402, 502, 602, 702, 802, 902, 1002, 1102) including a first piston (403, 503, 603, 703, 803, 903, 1003, 1103) to the DCV and to the rotary hydraulic motor, wherein the first cylinder is between the DCV and to the rotary hydraulic motor; operating the DCV to actuate the rotary hydraulic motor to open or close the one of a valve or an additional valve.

Example 41. The method of example 40, wherein coupling the first cylinder including the first piston (403, 503, 603, 703, 803, 903, 1003, 1103) to the DCV and to the rotary hydraulic motor includes: (a) coupling a first hydraulic fluid line to the first cylinder including the first piston and the DCV, and (b) coupling a second hydraulic fluid line to the first cylinder including the first piston and to the rotary hydraulic motor.

Example 42. The method of example 41, comprising: including a first hydraulic fluid in the first hydraulic fluid line; including a second hydraulic fluid in the second hydraulic fluid line.

Example 43. The method of example 42, wherein: the first hydraulic fluid has a first viscosity; the second hydraulic fluid has a second viscosity; the first viscosity is unequal to the second viscosity.

Example 44. The method according to any of examples 40-43, wherein: operating the DCV to actuate the hydraulic axial piston actuator to open or close the valve includes operating the DCV to actuate the hydraulic axial piston actuator to open the valve by moving the DCV into an open position and then leaving the DCV in the open position for at least 3 minutes after the valve is open; operating the DCV to actuate the rotary hydraulic motor to open or close the one of the valve or the additional valve includes operating the DCV to actuate the hydraulic axial piston actuator to open the one of the valve or the additional valve by moving the DCV into the open position and then leaving the DCV in the open position for at least 3 minutes after the one of the valve or an additional valve is open.

Example 45. The method according to any of examples 40-43, wherein: operating the DCV to actuate the hydraulic axial piston actuator to open or close the valve includes operating the DCV to actuate the hydraulic axial piston actuator to fully open the valve by moving the DCV into an open position a single time and then leaving the DCV in the open position for at least 3 minutes after the valve is open; operating the DCV to actuate the rotary hydraulic motor to open or close the one of the valve or the additional valve includes operating the DCV to actuate the hydraulic axial piston actuator to fully open the one of the valve or the additional valve by moving the DCV into the open position a single time and then leaving the DCV in the open position for at least 3 minutes after the one of the valve or an additional valve is open.

Example 46. The method according to any of examples 44-45 comprising: in response to moving the DCV into the open position and then leaving the DCV in the open position for at least 3 minutes after the valve is open, visually indicating the valve is open on a user interface of the DCV; in response to moving the DCV into the open position and then leaving the DCV in the open position for at least 3 minutes after the one of the valve or an additional valve is open, visually indicating the valve is open on a user interface of the DCV.

Example 47. The method according to any of examples 40-43, comprising: in response to operating the DCV to actuate the hydraulic axial piston actuator to open or close the valve, moving the DCV into the hold position for at least 3 minutes after the valve is open; in response to operating the DCV to actuate the rotary hydraulic motor to open or close the one of the valve or the additional valve, moving the DCV into the hold position for at least 3 minutes after the one of the valve or an additional valve is open.

Example 48. The method of example 47 comprising: in response to operating the DCV to actuate the hydraulic axial piston actuator to open or close the valve, visually indicating the valve is open on a user interface of the DCV before and after moving the DCV into the hold position for at least 3 minutes after the valve is open; in response to operating the DCV to actuate the rotary hydraulic motor to open or close the one of the valve or the additional valve, visually indicating the one of the valve or the additional valve is open on the user interface of the DCV before and after moving the DCV into the hold position.

Embodiments may include various combinations of components described herein. For example, an embodiment may include a package (e.g., a shrink-wrapped pallet) or shipment including one or more HICs, a valve, and a rotary motor. Some shipments may include only the HIC. Some shipments may include an HIC and one or both of the valve and/or the rotary motor. In some embodiments, any of the HICs, valve, and/or rotary motor may be formed or assembled into a fixed unit. For example, the valve and motor may constitute a single unit that is fixed together.

As used herein, a “cylinder” includes a chamber or body of any cross-section (including, but not limited to, an ovular cross-section). Thus, a “first cylinder” and the like as used herein does not necessarily mean a cylinder or body having a circular or even ovular cross-section.

The foregoing description of the embodiments of the invention has been presented for the purposes of illustration and description. It is not intended to be exhaustive or to limit the invention to the precise forms disclosed. This description and the claims following include terms, such as left, right, top, bottom, over, under, upper, lower, first, second, etc. that are used for descriptive purposes only and are not to be construed as limiting. For example, terms designating relative vertical position refer to a situation where a side of a substrate is the “top” surface of that substrate; the substrate may actually be in any orientation so that a “top” side of a substrate may be lower than the “bottom” side in a standard terrestrial frame of reference and still fall within the meaning of the term “top.” The term “on” as used herein (including in the claims) does not indicate that a first layer “on” a second layer is directly on and in immediate contact with the second layer unless such is specifically stated; there may be a third layer or other structure between the first layer and the second layer on the first layer. The embodiments of a device or article described herein can be manufactured, used, or shipped in a number of positions and orientations. Persons skilled in the relevant art can appreciate that many modifications and variations are possible in light of the above teaching. Persons skilled in the art will recognize various equivalent combinations and substitutions for various components shown in the Figures. It is therefore intended that the scope of the invention be limited not by this detailed description, but rather by the claims appended hereto.

What is claimed is:

1. A system comprising:

a hydraulic fluid source;

a first cylinder including a first piston;

a first hydraulic fluid line coupling the hydraulic fluid source to the first cylinder, the first hydraulic fluid line including a first hydraulic fluid;

a rotary hydraulic motor having an output shaft that is an actuator;

a second hydraulic fluid line coupling the first cylinder to the rotary hydraulic motor, the second hydraulic fluid line including a second hydraulic fluid;

wherein the first cylinder is located above water and the rotary hydraulic motor is located underwater.

2. The system of claim 1, wherein:

the first hydraulic fluid has a first viscosity;

the second hydraulic fluid has a second viscosity;

the first viscosity is unequal to the second viscosity.

3. The system of claim 1, wherein the first and second hydraulic fluids are isolated from one another.

4. The system of claim 3, wherein the second hydraulic fluid is at least partially included in the rotary hydraulic motor.

5. The system of claim 4, wherein:

the first cylinder includes first and second ends that oppose one another;

the first cylinder includes a resilient member that biases the first piston towards one of the first and second ends of the first cylinder.

6. The system of claim 1 comprising a second cylinder including a second piston, wherein:

the rotary hydraulic motor has first and second ports that respectively input and output the second hydraulic fluid;

the second hydraulic fluid line couples the first cylinder to the first port of the rotary hydraulic motor;

a third hydraulic fluid line couples the second cylinder to the rotary hydraulic motor, the third hydraulic fluid line including the second hydraulic fluid.

7. The system of claim 6, wherein:

the second cylinder includes first and second ends that oppose one another;

the second cylinder includes a resilient member that biases the second piston towards one of the first and second ends of the second cylinder.

8. The system of claim 6, wherein:

the second hydraulic fluid is at least partially included in the first cylinder;

the second hydraulic fluid is at least partially included in the rotary hydraulic motor;

the second hydraulic fluid is at least partially included in the second cylinder.

9. The system of claim 1, wherein:

the first hydraulic fluid is incompressible;

the second hydraulic fluid is incompressible.

10. The system of claim 1, wherein the rotary hydraulic motor has case leakage.

11. The system of claim 10, wherein the case leakage is between 0.5% and 3.0% of flow of the second hydraulic fluid through the rotary hydraulic motor.

12. The system of claim 1 comprising a directional control valve, wherein the directional control valve is coupled between the hydraulic fluid source and the first cylinder.

13. The system of claim 12, wherein the directional control valve is a 3 position spring return directional control valve, a 3 position non-centering directional control valve, or a 2-position directional control valve.

14. The system of claim 13 comprising a second cylinder including a second piston, wherein:

in a first orientation the directional control valve is to allow the first and second pistons to simultaneously travel respectively within the first and second cylinders in response to the first hydraulic fluid flowing in the first hydraulic fluid line;

in a second orientation the directional control valve is to disallow the first and second pistons from simultaneously traveling respectively within the first and second cylinders.

15. The system of claim 14, wherein:

the directional control valve includes a channel;

in the first orientation the channel is open and in the second orientation the channel is closed.

16. The system of claim 1 comprising at least one of a pressure sensor or a flow sensor.

17. The system of claim 1, wherein the first cylinder is located at least 50 meters from the rotary hydraulic motor.

18. The system of claim 1 comprising a valve, wherein:

the actuator is coupled to the valve;

the actuator is operatively coupled to the valve to open and close the valve.

19. The system of claim 18 wherein the valve is to fully open in response to the first piston traversing from one end of the first cylinder to an opposing end of the first cylinder.

* * * * *